(12) United States Patent
Matsunaga

(10) Patent No.: US 11,747,665 B2
(45) Date of Patent: Sep. 5, 2023

(54) DISPLAY DEVICE

(71) Applicant: Japan Display Inc., Tokyo (JP)

(72) Inventor: Kazuki Matsunaga, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/701,980

(22) Filed: Mar. 23, 2022

(65) Prior Publication Data

US 2022/0317496 A1 Oct. 6, 2022

(30) Foreign Application Priority Data

Mar. 31, 2021 (JP) ................................. 2021-061481

(51) Int. Cl.
*G02F 1/1333* (2006.01)
*G02F 1/1335* (2006.01)
*G06V 40/13* (2022.01)
*F21V 8/00* (2006.01)

(52) U.S. Cl.
CPC ......... *G02F 1/13338* (2013.01); *G02B 6/003* (2013.01); *G02F 1/133524* (2013.01); *G06V 40/1318* (2022.01)

(58) Field of Classification Search
CPC ........... G02F 1/13338; G02F 1/133524; G02B 6/003; G06V 40/1318
See application file for complete search history.

(56) References Cited

U.S. PATENT DOCUMENTS

2017/0220844 A1* 8/2017 Jones ................. G06V 40/1318
2018/0012069 A1 1/2018 Chung et al.

FOREIGN PATENT DOCUMENTS

JP 2006-195388 A 7/2006
WO WO-2017211152 A1 * 12/2017 ............. G06F 21/32

* cited by examiner

*Primary Examiner* — Abhishek Sarma
(74) *Attorney, Agent, or Firm* — K&L Gates LLP

(57) ABSTRACT

A display device includes a display panel, a plurality of light-receiving elements that are located inside a display region of the display panel as viewed from a normal direction of the display panel, and are configured to receive light, and a light guide provided so as to overlap the light-receiving elements. The light guide comprises light guide paths at least partially overlapping the light-receiving elements, and comprises a light-blocking portion having higher absorbance of the light than that of the light guide paths, and the light guide paths are inclined in a predetermined first direction with respect to the normal direction of the display panel.

11 Claims, 21 Drawing Sheets

FIG.19
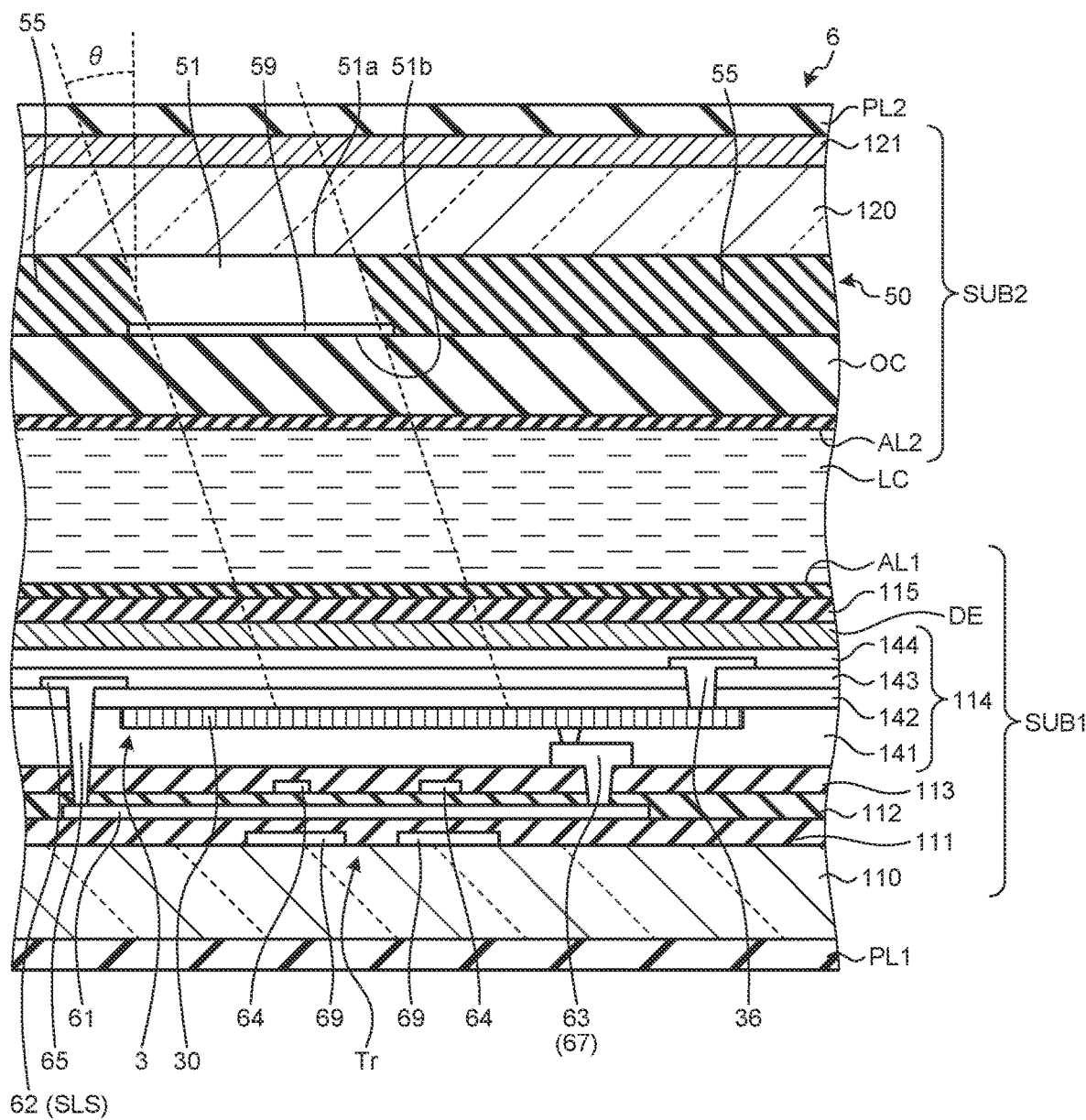
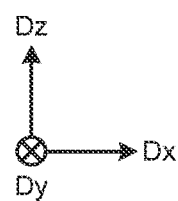

FIG.24
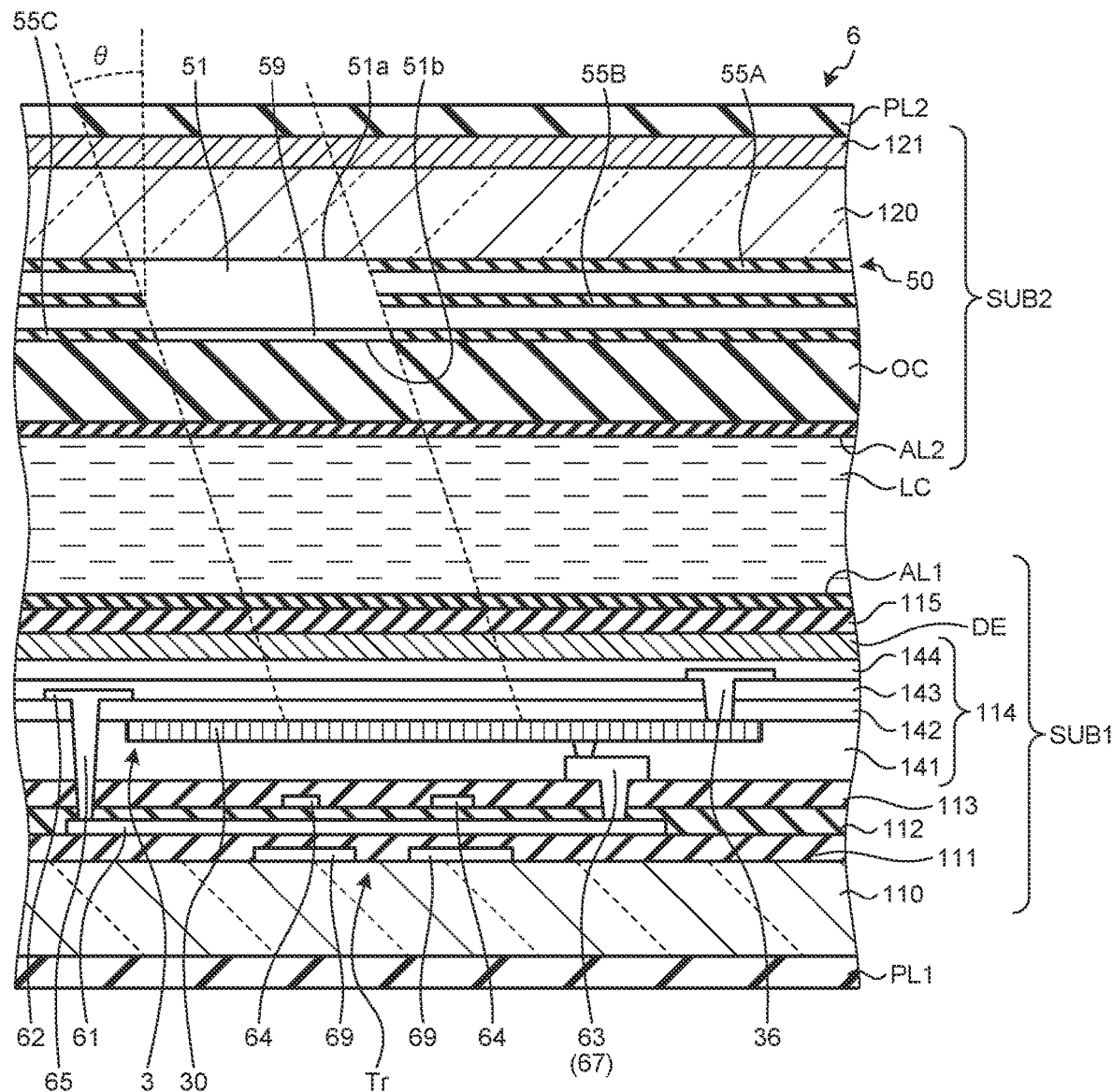
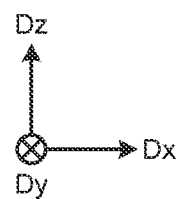

DISPLAY DEVICE

CROSS-REFERENCE TO RELATED APPLICATION

This application claims the benefit of priority from Japanese Patent Application No. 2021-061481 filed on Mar. 31, 2021, the entire contents of which are incorporated herein by reference.

BACKGROUND

1. Technical Field

The present disclosure relates to a display device.

2. Description of the Related Art

In recent years, optical sensors have been known as sensors used, for example, for personal authentication (for example, United States Patent Application Publication No. 2018/0012069 (USP-A-2018/0012069)). An optical sensor includes a light-receiving element in which an output signal changes according to an amount of light received. In a sensor described in USP-A-2018/0012069, a plurality of light-receiving elements such as photodiodes are arranged on a substrate.

Viewing angle control devices have also been known that control the viewing angle of a vehicle on-board display device so as to be visible from the front passenger seat while being limited from being viewed from the driver's seat (for example, Japanese Patent Application Laid-open Publication No. 2006-195388).

An optical detection device described in USP-A-2018/0012069 needs to guide reflected light of light of a display panel to the light-receiving element. In the optical detection device, room for improvement is left to reduce outside light and stray light, and guide the reflected light of the light of the display panel to the light-receiving element.

The present disclosure has been made in view of the above-described problem, and aims to provide a display device that reduces a drop in signal-to-noise ratio (S/N).

SUMMARY

A display device according to an embodiment of the present disclosure includes a display panel, a plurality of light-receiving elements that are located inside a display region of the display panel as viewed from a normal direction of the display panel, and are configured to receive light, and a light guide provided so as to overlap the light-receiving elements. The light guide comprises light guide paths at least partially overlapping the light-receiving elements, and comprises a light-blocking portion having higher absorbance of the light than that of the light guide paths, and the light guide paths are inclined in a predetermined first direction with respect to the normal direction of the display panel.

BRIEF DESCRIPTION OF THE DRAWINGS

FIG. 19 is a sectional view taken along XIX-XIX indicated in FIG. 17;

FIG. 24 is a sectional view of the light-receiving element according to a first modification of the second embodiment.

DETAILED DESCRIPTION

Figure 1:
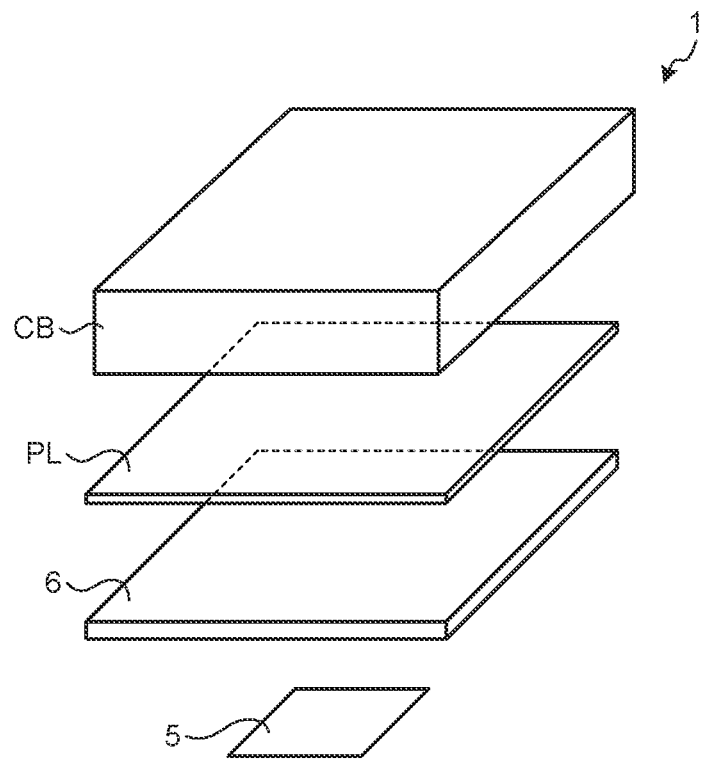
FIG. 1 is a perspective view schematically illustrating a display device according to a first embodiment of the present disclosure.

The following describes a mode (first embodiment) for carrying out the present invention in detail with reference to the drawings. The present disclosure is not limited to the description of the first embodiment to be given below. Components described below include those easily conceivable by those skilled in the art or those substantially identical thereto. Moreover, the components to be described below can be combined as appropriate. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In the embodiments of the present disclosure, in expressing an aspect of disposing a first structure above a second structure, a case of simply expressing "above" includes both a case of disposing the first structure immediately above the second structure so as to contact the second structure and a case of disposing the first structure above the second structure with a third structure interposed therebetween, unless otherwise specified.

First Embodiment

Figure 2:
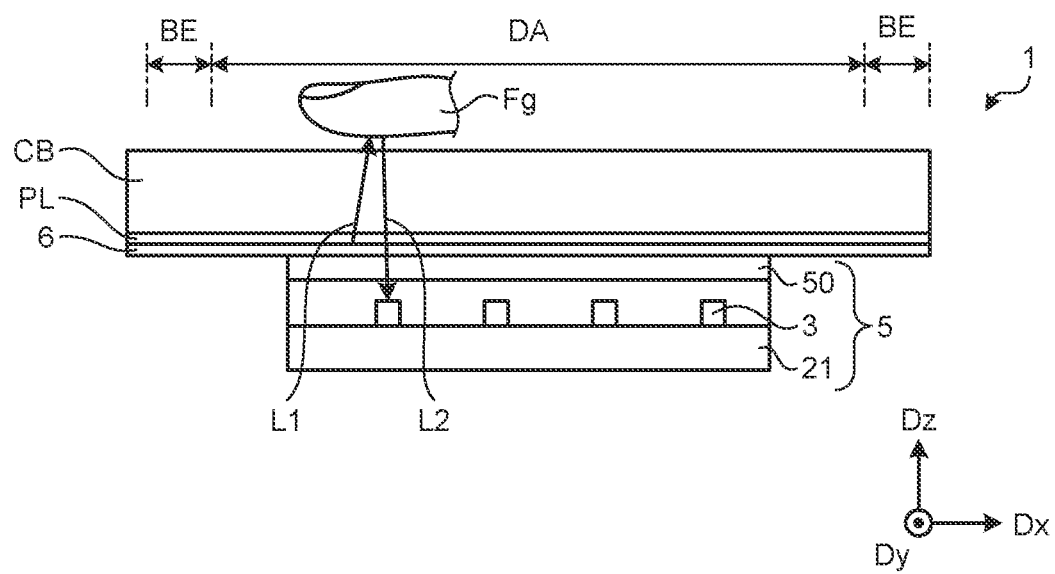
FIG. 2 is a sectional view schematically illustrating a section of the display device according to the first embodiment.

FIG. 1 is a perspective view schematically illustrating a display device according to the first embodiment. FIG. 2 is a sectional view schematically illustrating a section of the display device according to the first embodiment. As illustrated in FIG. 1, a display device 1 includes an optical sensor 5, a display panel 6, and a light-transmitting cover member CB. The polarizing plate PL is superimposed on the display panel 6.

As illustrated in FIG. 2, the optical sensor 5 is located on a side opposite to a visible side of the display panel 6, and is superimposed on a display region DA of the display panel 6. The optical sensor 5 is not superimposed on a bezel region BE located around the display region DA. This configuration allows the optical sensor 5 to detect information on an object to be detected Fg using light L1 emitted from the display panel 6.

As illustrated in FIG. 2, the optical sensor 5 includes a substrate 21, a light-receiving element 3, and a light guide 50. The light-receiving element 3 detects light L2 from the object to be detected Fg. Specifically, when the light L1 from the display panel 6 reaches the object to be detected Fg, the light L1 is transmitted through or reflected by the object to be detected Fg to become the light L2, and the light L2 is transmitted through the cover member CB, the polarizing plate PL, and display panel 6. The light L2 enters the light guide 50. The light L2 passes through the light guide 50, and enters the light-receiving element 3. Thus, the optical sensor 5 can detect light L. The object to be detected Fg is, for example, a finger, a palm, or a wrist. For example, the optical sensor 5 can detect information on, for example, a fingerprint of the object to be detected Fg based on the light L2. The optical sensor 5 may also detect various types of information (biological information) such as a shape of blood vessels, pulsation, and a pulse wave.

The light guide 50 is an optical filter, and is an optical element that transmits a component of the light L2 reflected by an object to be detected, such as the object to be detected Fg, that travels in a direction inclined in a predetermined direction with respect to a third direction Dz toward a photodiode 30, and attenuates components that travel in other directions. The light guide 50 is also called a collimating aperture or a collimator. The light guide 50 is provided on a side of the light-receiving element 3 closer to the object to be detected Fg, and faces the light-receiving element 3. The light guide 50 includes a plurality of light guide paths 51 and a light-blocking portion 55 provided around the light guide paths 51.

The display panel 6 of the first embodiment is, for example, an organic electroluminescent (EL) (organic light-emitting diode (OLED)) display panel. The display panel 6 may be, for example, an inorganic EL (micro LED or mini LED) display. Alternatively, the display panel 6 may be a liquid crystal display (LCD) panel using liquid crystal elements as display elements.

Figure 3:
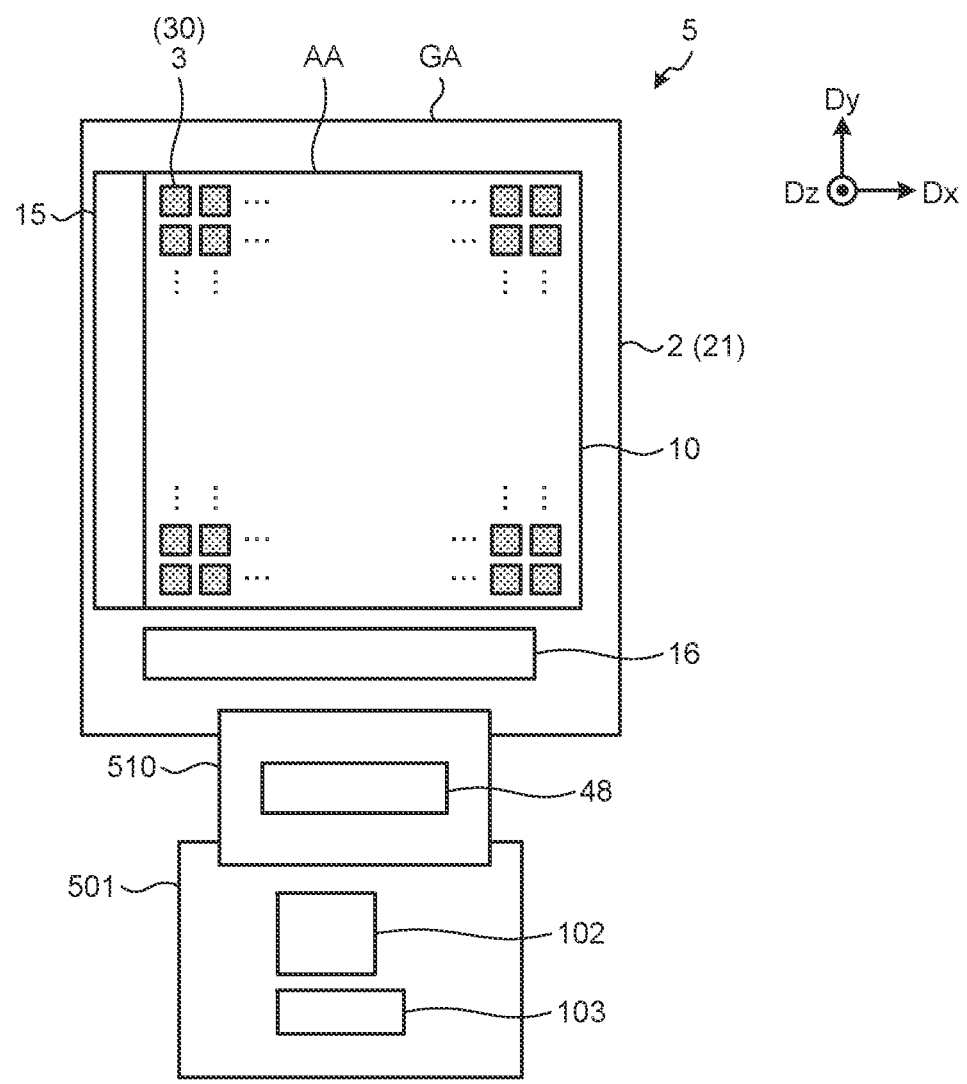
FIG. 3 is a plan view schematically illustrating a detection device according to the first embodiment.

FIG. 3 is a plan view schematically illustrating the detection device according to the first embodiment. As illustrated in FIG. 3, the optical sensor 5 includes a light-receiving element array substrate 2 (substrate 21), the light-receiving elements 3, a scan line drive circuit 15, a signal line selection circuit 16, a detection circuit 48, a control circuit 102, and a power supply circuit 103.

The substrate 21 is electrically coupled to a control substrate 501 through a wiring substrate 510. The wiring substrate 510 is, for example, a flexible printed circuit board or a rigid circuit board. The wiring substrate 510 is provided with the detection circuit 48. The control substrate 501 is provided with the control circuit 102 and the power supply circuit 103. The control circuit 102 is, for example, a field-programmable gate array (FPGA). The control circuit 102 supplies control signals to a sensor unit 10, the scan line drive circuit 15, and the signal line selection circuit 16 to control detection operations of the sensor unit 10. The power supply circuit 103 supplies voltage signals including, for example, a power supply potential SVS and a reference potential VR1 (refer to FIG. 5) to the sensor unit 10, the scan line drive circuit 15, and the signal line selection circuit 16. While the first embodiment exemplifies the case of disposing the detection circuit 48 on the wiring substrate 510, the present disclosure is not limited to this case. The detection circuit 48 may be disposed above the substrate 21.

The substrate 21 has a detection region AA and a peripheral region GA. The detection region AA is a region provided with the light-receiving elements 3 included in the sensor unit 10. The peripheral region GA is a region outside the detection region AA, and is a region not provided with the light-receiving elements 3. That is, the peripheral region GA is a region between the outer perimeter of the detection region AA and outer edges of the substrate 21.

Each of the light-receiving elements 3 of the sensor unit 10 is a photosensor including the photodiode 30 as a sensor element. The photodiode 30 outputs an electrical signal corresponding to light emitted thereto. More specifically, the photodiode 30 is a positive-intrinsic-negative (PIN) photodiode or an organic photodiode (OPD). The light-receiving elements 3 are arranged in a matrix having a row-column configuration in the detection region AA. The photodiode 30 included in each of the light-receiving elements 3 performs the detection according to a gate drive signal supplied from the scan line drive circuit 15. Each of the photodiodes 30 outputs the electrical signal corresponding to the light emitted thereto as a detection signal Vdet to the signal line selection circuit 16. The display device 1 detects the information on the object to be detected Fg based on the detection signals Vdet received from the photodiodes 30.

The scan line drive circuit 15 and the signal line selection circuit 16 are provided in the peripheral region GA. Specifically, the scan line drive circuit 15 is provided in an area of the peripheral region GA extending along a second direction Dy. The signal line selection circuit 16 is provided in an area of the peripheral region GA extending along a first direction Dx, and is provided between the sensor unit 10 and the detection circuit 48.

The first direction Dx is one direction in a plane parallel to the substrate 21. The second direction Dy is one direction in the plane parallel to the substrate 21, and is a direction orthogonal to the first direction Dx. The second direction Dy may non-orthogonally intersect the first direction Dx. The third direction Dz is a direction orthogonal to the first direction Dx and the second direction Dy, and is a direction normal to the substrate 21.

Figure 4:
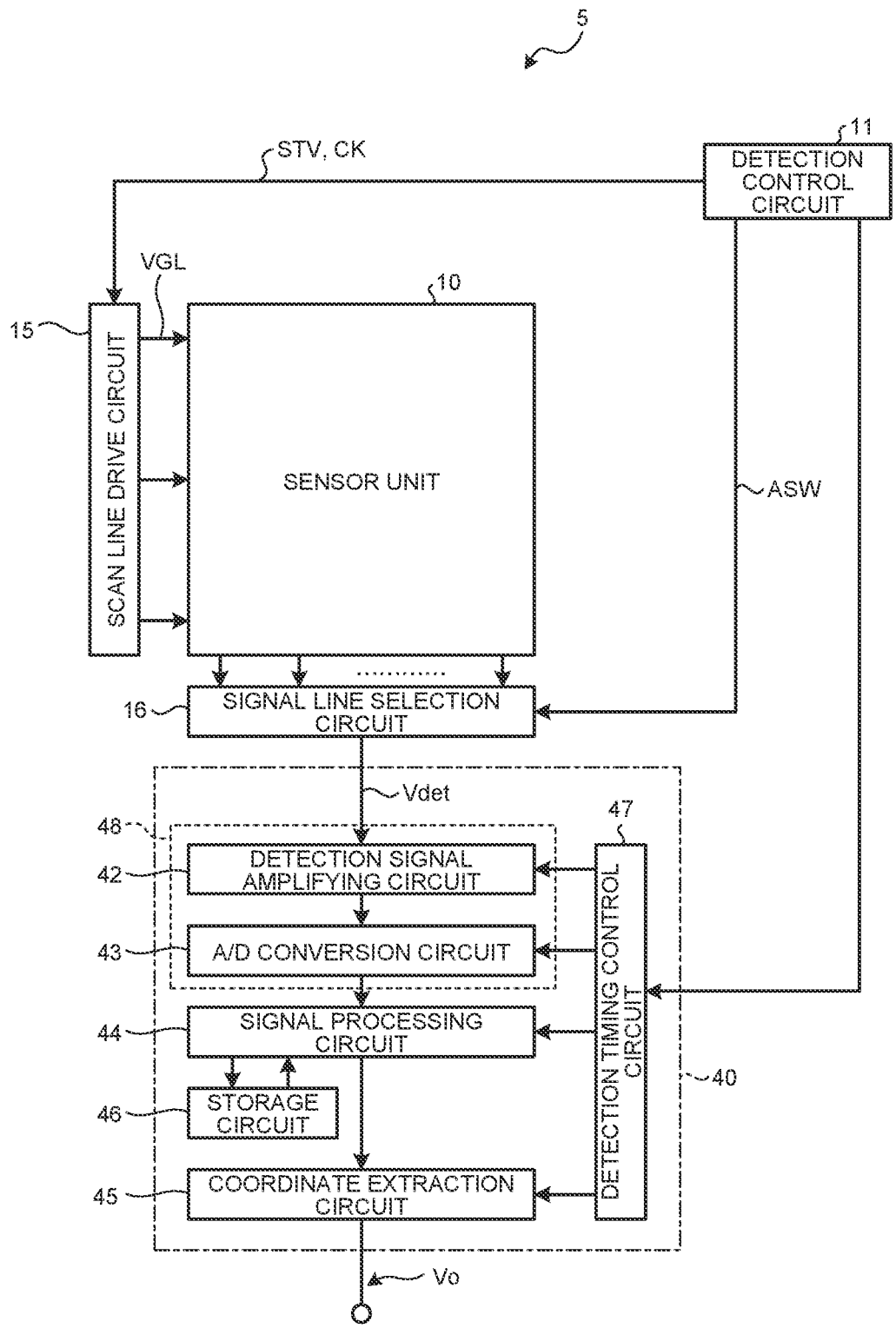
FIG. 4 is a block diagram illustrating a configuration example of the detection device according to the first embodiment.

FIG. 4 is a block diagram illustrating a configuration example of the detection device according to the first embodiment. As illustrated in FIG. 4, the display device 1 further includes a detection control circuit 11 and a detector 40. One, some, or all functions of the detection control circuit 11 are included in the control circuit 102. One, some, or all functions of the detector 40 other than those of the detection circuit 48 are also included in the control circuit 102.

The detection control circuit 11 is a circuit that supplies a control signal to each of the scan line drive circuit 15, the signal line selection circuit 16, and the detector 40 to control operations of these components. The detection control circuit 11 supplies various control signals including, for example, a start signal STV and a clock signal CK to the scan line drive circuit 15. The detection control circuit 11 also supplies various control signals including, for example, a selection signal ASW to the signal line selection circuit 16.

The scan line drive circuit 15 is a circuit that drives a plurality of scan lines GLS (refer to FIG. 5) based on the various control signals. The scan line drive circuit 15 sequentially or simultaneously selects the scan lines GLS, and supplies gate drive signals VGL to the selected scan lines GLS. Through this operation, the scan line drive circuit 15 selects the photodiodes 30 coupled to the scan lines GLS.

Figure 5:
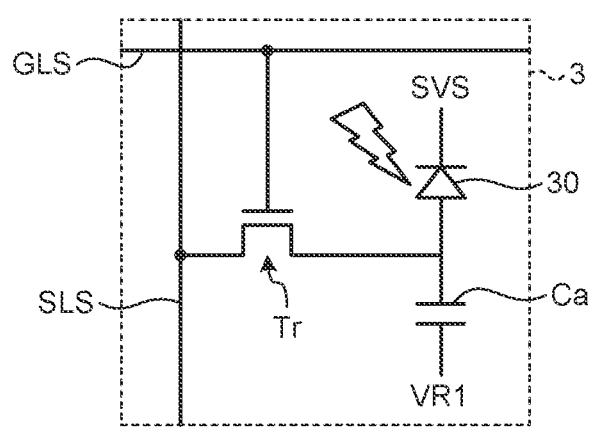
FIG. 5 is a circuit diagram illustrating a light-receiving element.

The signal line selection circuit 16 is a switching circuit that sequentially or simultaneously selects a plurality of output signal lines SLS (refer to FIG. 5). The signal line selection circuit 16 is, for example, a multiplexer. The signal line selection circuit 16 couples the selected output signal lines SLS to the detection circuit 48 based on the selection signal ASW supplied from the detection control circuit 11. Through this operation, the signal line selection circuit 16 outputs the detection signal Vdet of the photodiode 30 to the detector 40.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front-end (AFE) circuit. The detection circuit 48 is a signal processing circuit having functions of at least a detection signal amplifying circuit 42 and an analog-to-digital (A/D) conversion circuit 43. The detection signal amplifying circuit 42 is a circuit that amplifies the detection signal Vdet, and is, for example, an integration circuit. The A/D conversion circuit 43 converts an analog signal output from the detection signal amplifying circuit 42 into a digital signal.

The signal processing circuit 44 is a logic circuit that detects a predetermined physical quantity received by the sensor unit 10 based on output signals of the detection circuit 48. The signal processing circuit 44 can detect the information based on the light reflected by the object to be detected Fg based on the signals from the detection circuit 48 when the object to be detected Fg is in contact with or in proximity to a detection surface (cover member CB). The signal processing circuit 44 can also extract other biological information such as the fingerprint, the pulse wave, the pulsation, and a blood oxygen saturation level based on the signals from the detection circuit 48.

The storage circuit 46 temporarily stores therein signals calculated by the signal processing circuit 44. The storage circuit 46 may be, for example, a random access memory (RAM) or a register circuit.

The coordinate extraction circuit 45 is a logic circuit that obtains detected coordinates of the object to be detected Fg (for example, detected positions of asperities on a surface of the finger or detected positions of the blood vessels of the palm or the wrist) when the contact or proximity of the object to be detected Fg is detected by the signal processing circuit 44. The coordinate extraction circuit 45 combines the detection signals Vdet output from the respective light-receiving elements 3 of the sensor unit 10 to generate two-dimensional information representing a shape of the asperities on the surface of the finger or a blood vessel image. The coordinate extraction circuit 45 may output the detection signals Vdet as sensor outputs Vo instead of calculating the detected coordinates.

The following describes a circuit configuration example of the optical sensor 5. FIG. 5 is a circuit diagram illustrating the light-receiving element of the optical sensor 5. As illustrated in FIG. 5, the light-receiving element 3 includes the photodiode 30, a capacitive element Ca, and a first transistor Tr. The first transistor Tr is provided corresponding to the photodiode 30. The first transistor Tr is constituted by a thin-film transistor, and, in this example, is constituted by an n-channel metal oxide semiconductor (MOS) thin-film transistor (TFT). The gate of the first transistor Tr is coupled to a corresponding one of the scan lines GLS. The source of the first transistor Tr is coupled to a corresponding one of the output signal lines SLS. The drain of the first transistor Tr is coupled to the anode of the photodiode 30 and the capacitive element Ca.

The cathode of the photodiode 30 is supplied with the power supply potential SVS from the power supply circuit 103. The capacitive element Ca is supplied with the reference potential VR1 serving as an initial potential of the capacitive element Ca from the power supply circuit 103.

When the light-receiving element 3 is irradiated with light, a current corresponding to an amount of light flows through the photodiode 30. As a result, an electrical charge is stored in the capacitive element Ca. After the first transistor Tr is turned on, a current corresponding to the electrical charge stored in the capacitive element Ca flows through the output signal line SLS. The output signal line SLS is coupled to the detection circuit 48 through the signal line selection circuit 16. As a result, the display device 1 can detect a signal corresponding to the amount of the light irradiating the photodiode 30 for each of the light-receiving elements 3.

While FIG. 5 illustrates one of the light-receiving elements 3, the scan lines GLS and the output signal lines SLS are coupled to the light-receiving elements 3. Specifically, the scan lines GLS extend in the first direction Dx (refer to FIG. 2), and are coupled to the light-receiving elements 3 arranged in the first direction Dx. The output signal lines SLS extend in the second direction Dy, and are coupled to the light-receiving element 3 arranged in the second direction Dy.

The first transistor Tr is not limited to being constituted by the n-type TFT, and may be constituted by a p-type TFT. The light-receiving element 3 may be provided with a plurality of transistors corresponding to one photodiode 30.

Figure 6:
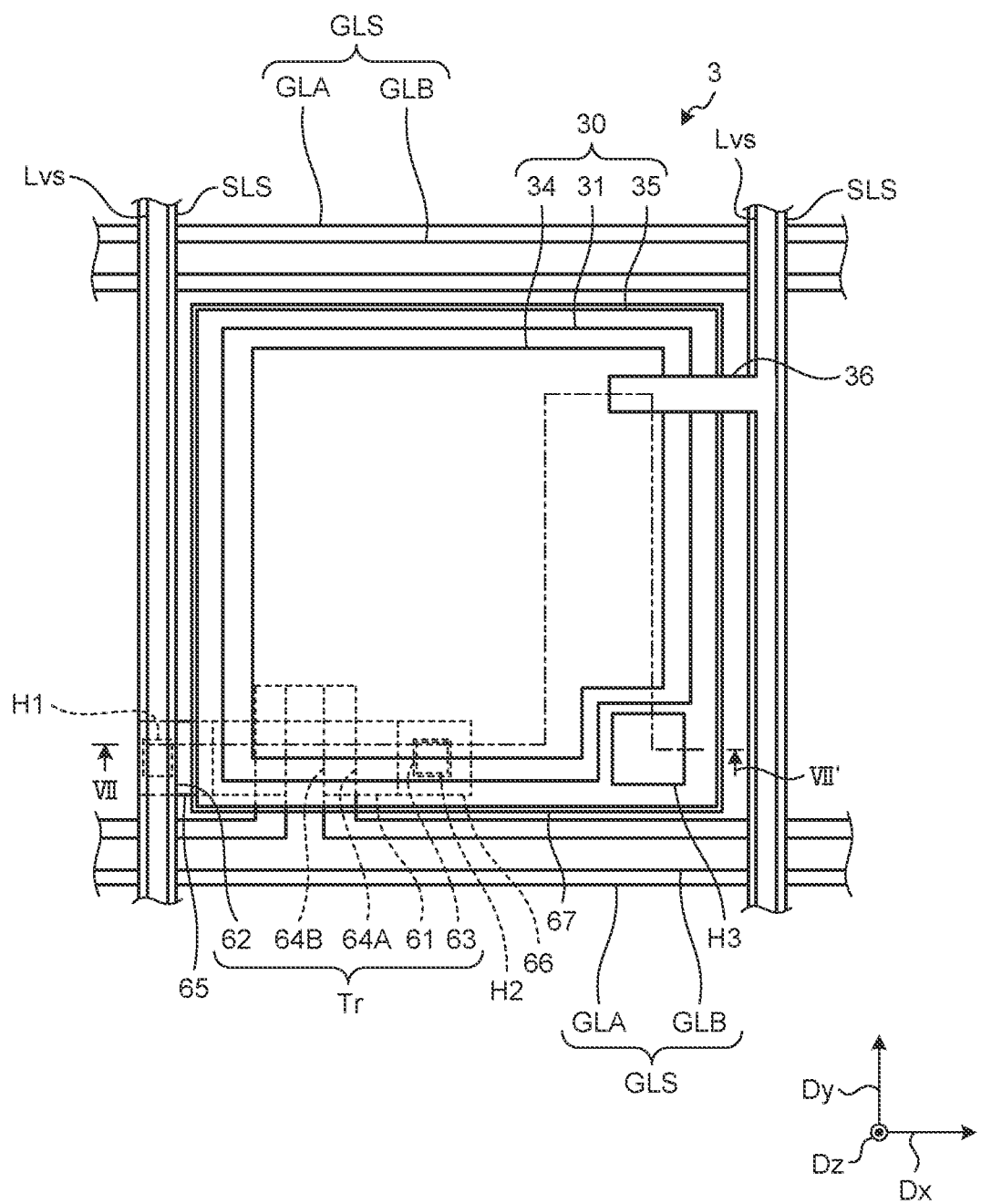
FIG. 6 is a plan view schematically illustrating the light-receiving element of the detection device according to the first embodiment.

The following describes a detailed configuration of the display device 1. FIG. 6 is a plan view schematically illustrating the light-receiving element of the detection device according to the first embodiment. As illustrated in FIG. 6, the light-receiving element 3 corresponds to an area surrounded by the scan lines GLS and the output signal lines SLS. In the first embodiment, each of the scan lines GLS includes a first scan line GLA and a second scan line GLB. The first scan line GLA is provided so as to overlap the second scan line GLB. The first scan line GLA and the second scan line GLB are provided in different layers with insulating layers 22c and 22d (refer to FIG. 7) interposed therebetween. The first scan line GLA and the second scan line GLB are electrically coupled together at any point, and are supplied with the gate drive signals VGL having the same potential. At least either of the first scan line GLA and the second scan line GLB is coupled to the scan line drive circuit 15. In FIG. 6, the first scan line GLA and the second scan line GLB have different widths, but may have the same width.

The photodiode 30 is provided in the area surrounded by the scan lines GLS and the output signal lines SLS. The photodiode 30 includes a semiconductor layer 31, an upper electrode 34, and a lower electrode 35. The photodiode 30 is, for example, a PIN photodiode.

The upper electrode 34 is coupled to a power supply signal line Lvs through coupling wiring 36. The power supply signal line Lvs is wiring that supplies the power supply potential SVS to the photodiode 30. In the first embodiment, the power supply signal line Lvs extends in the second direction Dy so as to overlap the output signal line SLS. The light-receiving elements 3 arranged in the second direction Dy are coupled to the common power supply signal line Lvs. Such a configuration can enlarge an opening for the light-receiving element 3. The lower electrode 35, the semiconductor layer 31, and the upper electrode 34 are substantially quadrilateral in a plan view. However, the shapes of the lower electrode 35, the semiconductor layer 31, and the upper electrode 34 are not limited thereto, and can be changed as appropriate.

The first transistor Tr is provided near an intersection between the scan line GLS and the output signal line SLS. The first transistor Tr includes a semiconductor layer 61, a source electrode 62, a drain electrode 63, a first gate electrode 64A, and a second gate electrode 64B.

The semiconductor layer 61 is an oxide semiconductor. The semiconductor layer 61 is more preferably a transparent amorphous oxide semiconductor (TAOS) among oxide semiconductors. Using an oxide semiconductor as the first transistor Tr can reduce a leakage current of the first transistor Tr. That is, the first transistor Tr can reduce the leak current from an unselected one of the light-receiving elements 3. As a result, the display device 1 can improve the S/N ratio. The semiconductor layer 61 is, however, not limited thereto, and may be formed of, for example, a microcrystalline oxide semiconductor, an amorphous oxide semiconductor, polysilicon, or low-temperature polycrystalline silicon (LTPS).

The semiconductor layer 61 is provided along the first direction Dx, and intersects the first gate electrode 64A and the second gate electrode 64B in the plan view. The first gate electrode 64A and the second gate electrode 64B are provided so as to branch off from the first scan line GLA and the second scan line GLB, respectively. In other words, portions of the first scan line GLA and the second scan line GLB that overlap the semiconductor layer 61 serve as the first gate electrode 64A and the second gate electrode 64B. Aluminum (Al), copper (Cu), silver (Ag), molybdenum (Mo), or an alloy thereof is used as the first gate electrode 64A and the second gate electrode 64B. A channel region is formed in a portion of the semiconductor layer 61 that overlaps the first gate electrode 64A and the second gate electrode 64B.

One end of the semiconductor layer 61 is coupled to the source electrode 62 through a contact hole H1. The other end of the semiconductor layer 61 is coupled to the drain electrode 63 through a contact hole H2. A portion of the output signal line SLS that overlaps the semiconductor layer 61 serves as the source electrode 62. A portion of a third conductive layer 67 that overlaps the semiconductor layer 61 serves as the drain electrode 63. The third conductive layer 67 is coupled to the lower electrode 35 through a contact hole H3. Such a configuration allows the first transistor Tr to switch between coupling and uncoupling between the photodiode 30 and the output signal line SLS.

The arrangement pitch of the light-receiving elements 3 (photodiodes 30) in the first direction Dx is defined by the arrangement pitch of the output signal line SLS in the first direction Dx. The arrangement pitch of the light-receiving elements 3 (photodiodes 30) in the second direction Dy is defined by the arrangement pitch of the scan line GLS in the second direction Dy.

Figure 7:
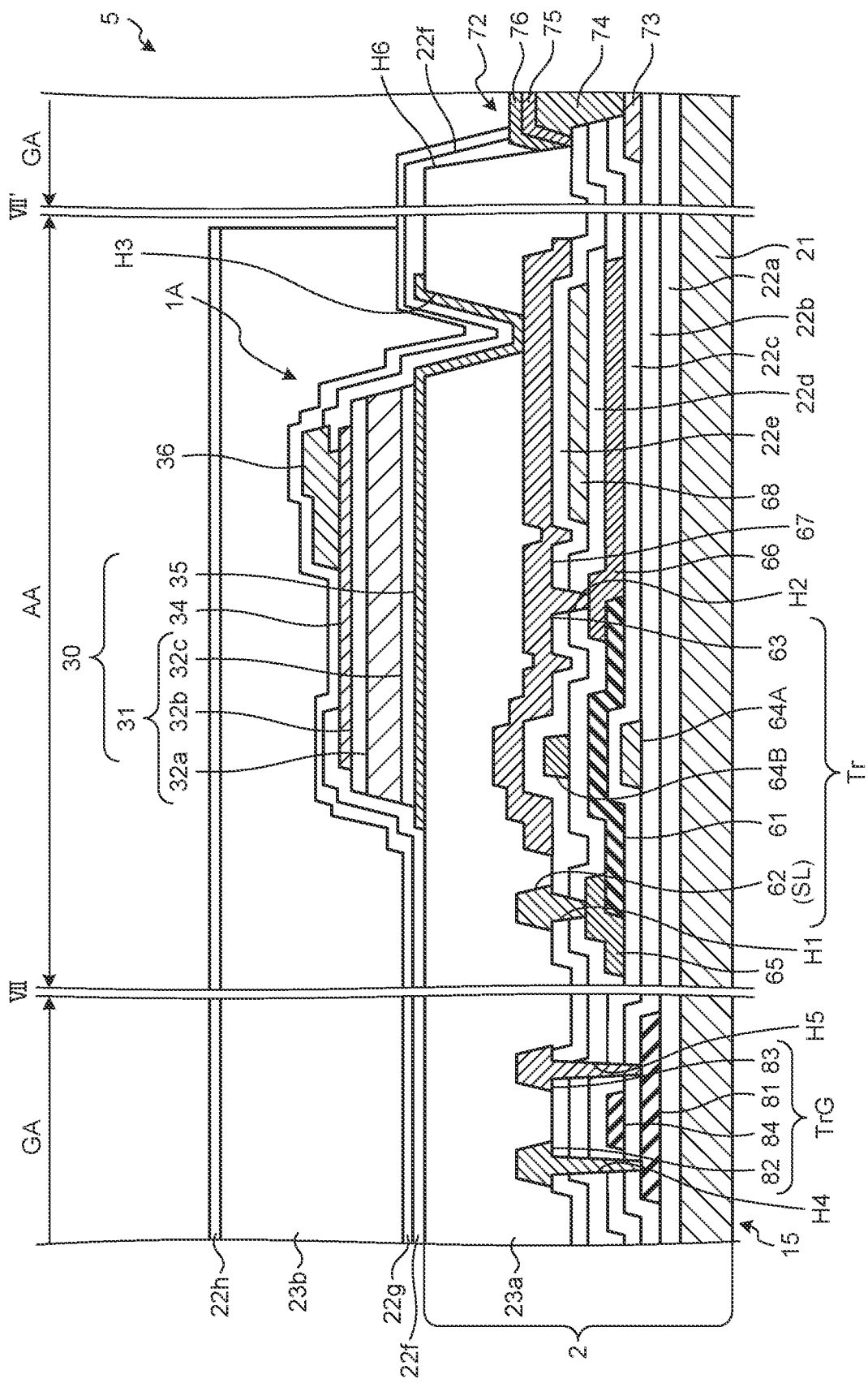
FIG. 7 is a VII-VII' sectional view of FIG. 6.

The following describes a layer configuration of the optical sensor 5. FIG. 7 is a VII-VII' sectional view of FIG. 6. In order to illustrate a relation between the layer structure of the detection region AA (refer to FIG. 3) and the layer structure of the peripheral region GA (refer to FIG. 3), FIG. 7 illustrates a section taken along a line VII-VII' and a section of a portion of the peripheral region GA that includes a second transistor TrG in a schematically connected manner. FIG. 7 further illustrates a section of a portion of the peripheral region GA that includes a terminal 72 in a schematically connected manner.

In the description of the optical sensor 5, the direction from the substrate 21 to the photodiode 30 in the direction perpendicular to the surface of the substrate 21 (third direction Dz) is referred to as "upper side" or "top". A direction from the photodiode 30 toward the substrate 21 is referred to as "lower side" or "below". The term "plan view" refers to a positional relation as viewed from the direction orthogonal to the surface of the substrate 21.

As illustrated in FIG. 7, the substrate 21 is an insulating substrate, and a glass substrate of, for example, quartz or alkali-free glass is used as the substrate 21. The first transistor Tr, various types of wiring (the scan line GLS and the output signal line SLS) and the insulating layers are provided to form the light-receiving element array substrate 2 on a surface on one side of the substrate 21. The photodiodes 30 are arranged above the light-receiving element array substrate 2, that is, on the one surface side of the substrate 21. The substrate 21 may be a resin substrate or a resin film made of a resin such as polyimide.

Insulating layers 22a and 22b are provided above the substrate 21. Insulating layers 22a, 22b, 22c, 22d, 22e, 22f, and 22g are inorganic insulating films, and are formed of a silicon oxide ($SiO_2$) or a silicon nitride (SiN). Each of the inorganic insulating layers is not limited to a single layer, and may be a multilayered film.

The first gate electrode 64A is provided above the insulating layer 22b. The insulating layer 22c is provided above the insulating layer 22b so as to cover the first gate electrode 64A. The semiconductor layer 61, a first conductive layer 65, and a second conductive layer 66 are provided above the insulating layer 22c. The first conductive layer 65 is provided so as to cover an end of the semiconductor layer 61 coupled to the source electrode 62. The second conductive layer 66 is provided so as to cover an end of the semiconductor layer 61 coupled to the drain electrode 63.

The insulating layer 22d is provided above the insulating layer 22c so as to cover the semiconductor layer 61, the first conductive layer 65, and the second conductive layer 66. The second gate electrode 64B is provided above the insulating layer 22d. The semiconductor layer 61 is provided between the first gate electrode 64A and the second gate electrode 64B in the direction orthogonal to the substrate 21. That is, the first transistor Tr has what is called a dual-gate structure. However, the first transistor Tr may have a bottom-gate structure that is provided with the first gate electrode 64A and not provided with the second gate electrode 64B, or a top-gate structure that is not provided with the first gate electrode 64A and provided with only the second gate electrode 64B.

The insulating layer 22e is provided above the insulating layer 22d so as to cover the second gate electrode 64B. The source electrode 62 (output signal line SLS) and the drain electrode 63 (third conductive layer 67) are provided above the insulating layer 22e. In the first embodiment, the drain electrode 63 is the third conductive layer 67 provided above the semiconductor layer 61 with the insulating layers 22d and 22e interposed therebetween. The source electrode 62 is electrically coupled to the semiconductor layer 61 through the contact hole H1 and the first conductive layer 65. The drain electrode 63 is electrically coupled to the semiconductor layer 61 through the contact hole H2 and the second conductive layer 66.

The third conductive layer 67 is provided in an area overlapping the photodiode 30 in the plan view. The third conductive layer 67 is also provided on the upper side of the semiconductor layer 61, the first gate electrode 64A, and the second gate electrode 64B. That is, the third conductive layer 67 is provided between the second gate electrode 64B and the lower electrode 35 in the direction orthogonal to the substrate 21. With this configuration, the third conductive layer 67 has a function as a protective layer that protects the first transistor Tr.

The second conductive layer 66 extends so as to face the third conductive layer 67 in an area not overlapping the semiconductor layer 61. A fourth conductive layer 68 is provided above the insulating layer 22d in the area not overlapping the semiconductor layer 61. The fourth conductive layer 68 is provided between the second conductive layer 66 and the third conductive layer 67. This configuration generates capacitance between the second conductive layer 66 and the fourth conductive layer 68, and capacitance between the third conductive layer 67 and the fourth conductive layer 68. The capacitance generated by the second conductive layer 66, the third conductive layer 67, and the fourth conductive layer 68 serves as capacitance of the capacitive element Ca illustrated in FIG. 5.

A first organic insulating layer 23a is provided above the insulating layer 22e so as to cover the source electrode 62 (output signal line SLS) and the drain electrode 63 (third conductive layer 67). The first organic insulating layer 23a is a planarizing layer that planarizes asperities formed by the first transistor Tr and various conductive layers.

The following describes a sectional configuration of the photodiode 30. The photodiode 30 is stacked above the first organic insulating layer 23a of the light-receiving element array substrate 2 in the order of the lower electrode 35, the semiconductor layer 31, and the upper electrode 34. The light-receiving element array substrate 2 is a drive circuit board that drives the sensor for each predetermined detection region. The light-receiving element array substrate 2 includes the substrate 21 and, for example, the first transistor Tr, the second transistor TrG, and the various types of wiring provided on the substrate 21.

The lower electrode 35 is provided above the first organic insulating layer 23a, and is electrically coupled to the third conductive layer 67 through the contact hole H3. The lower electrode 35 is the anode of the photodiode 30, and is an electrode for reading the detection signal Vdet. For example, a metal material such as molybdenum (Mo) or aluminum (Al) is used as the lower electrode 35. Alternatively, the lower electrode 35 may be a multilayered film formed of a plurality of layers of these metal materials. The lower electrode 35 may be formed of a light-transmitting conductive material such as indium tin oxide (ITO) or indium zinc oxide (IZO).

The semiconductor layer 31 is formed of amorphous silicon (a-Si). The semiconductor layer 31 includes an i-type semiconductor layer 32a, an n-type semiconductor layer 32b, and a p-type semiconductor layer 32c. The i-type semiconductor layer 32a, the n-type semiconductor layer 32b, and the p-type semiconductor layer 32c constitute a specific example of a photoelectric conversion element. In FIG. 7, the p-type semiconductor layer 32c, the i-type semiconductor layer 32a, and the n-type semiconductor layer 32b are stacked in this order in the direction orthogonal to the surface of the substrate 21. However, the semiconductor layer 31 may have a reversed configuration. That is, the n-type semiconductor layer 32b, the i-type semiconductor layer 32a, and the p-type semiconductor layer 32c may be stacked in this order. The semiconductor layer 31 may be a photoelectric conversion element formed of organic semiconductors.

The a-Si of the n-type semiconductor layer 32b is doped with impurities to form an n+ region. The a-Si of the p-type semiconductor layer 32c is doped with impurities to form a p+ region. The i-type semiconductor layer 32a is, for example, a non-doped intrinsic semiconductor, and has lower conductivity than that of the n-type semiconductor layer 32b and the p-type semiconductor layer 32c.

The upper electrode 34 is the cathode of the photodiode 30, and is an electrode for supplying the power supply potential SVS to the photoelectric conversion layer. The upper electrode 34 is, for example, a light-transmitting conductive layer such as ITO, and a plurality of the upper electrodes 34 are provided for each photodiode 30.

The insulating layers 22f and 22g are provided above the first organic insulating layer 23a. The insulating layer 22f covers the periphery of the upper electrode 34, and is provided with an opening in a position overlapping the upper electrode 34. The coupling wiring 36 is coupled to the upper electrode 34 at a portion of the upper electrode 34 not provided with the insulating layer 22f. The insulating layer 22g is provided above the insulating layer 22f so as to cover the upper electrode 34 and the coupling wiring 36. A second organic insulating layer 23b serving as the planarizing layer is provided above the insulating layer 22g. If the photodiode is made of organic semiconductors, an insulating layer 22h may be further provided above the photodiode.

The second transistor TrG of the scan line drive circuit 15 is provided in the peripheral region GA. The second transistor TrG is provided on the same substrate 21 as that of the first transistor Tr. The second transistor TrG includes a semiconductor layer 81, a source electrode 82, a drain electrode 83, and a gate electrode 84.

The semiconductor layer 81 is formed of polysilicon. The semiconductor layer 81 is more preferably low-temperature polysilicon (LTPS). The semiconductor layer 81 is provided above the insulating layer 22a. That is, the semiconductor layer 61 of the first transistor Tr is provided in a position farther from the substrate 21 than the semiconductor layer 81 of the second transistor TrG is in the direction orthogonal to the substrate 21. However, the semiconductor layer 81 is not limited to this configuration, and may be formed in the same layer and of the same material as the semiconductor layer 61.

The gate electrode 84 is provided above the semiconductor layer 81 with the insulating layer 22b interposed therebetween. The gate electrode 84 is provided in the same layer as the first gate electrode 64A. The second transistor TrG has what is called a top-gate structure. However, the second transistor TrG may have a dual-gate structure or a bottom-gate structure.

The source electrode 82 and the drain electrode 83 are provided above the insulating layer 22e. The source electrode 82 and the drain electrode 83 are provided in the same layer as the source electrode 62 and drain electrode 63 of the first transistor Tr. Contact holes H4 and H5 are provided passing through the insulating layers 22b to 22e. The source electrode 82 is electrically coupled to the semiconductor layer 81 through the contact hole H4. The drain electrode 83 is electrically coupled to the semiconductor layer 81 through the contact hole H5.

The terminal 72 is provided in a position of the peripheral region GA different from the area provided with the scan line drive circuit 15. The terminal 72 includes a first terminal conductive layer 73, a second terminal conductive layer 74, a third terminal conductive layer 75, and a fourth terminal conductive layer 76. The first terminal conductive layer 73 is provided in the same layer as the first gate electrode 64A above the insulating layer 22b. A contact hole H6 is provided so as to continue through the insulating layers 22c, 22d, 22e and the first organic insulating layer 23a.

The second terminal conductive layer 74, the third terminal conductive layer 75, and the fourth terminal conductive layer 76 are stacked in this order in the contact hole H6, and is electrically coupled to the first terminal conductive layer 73. The second terminal conductive layer 74 can be formed using the same material and the same process as those of, for example, the third conductive layer 67. The third terminal conductive layer 75 can be formed using the same material and the same process as those of the lower electrode 35. The fourth terminal conductive layer 76 can be formed using the same material and the same process as those of the coupling wiring 36 and the power supply signal line Lvs (refer to FIG. 6).

While FIG. 7 illustrates one terminal 72, a plurality of the terminals 72 are arranged at intervals. The terminals 72 are electrically coupled to the wiring substrate 510 (refer to FIG. 2) by, for example, an anisotropic conductive film (ACF).

The optical sensor 5 is not limited to the structure described above as long as the photodiode 30 can detect the light L2. The optical sensor 5 may detect information other than the information on the fingerprint as long as the optical sensor 5 detects the information by receiving the light L2 using the photodiode 30.

Figure 8:
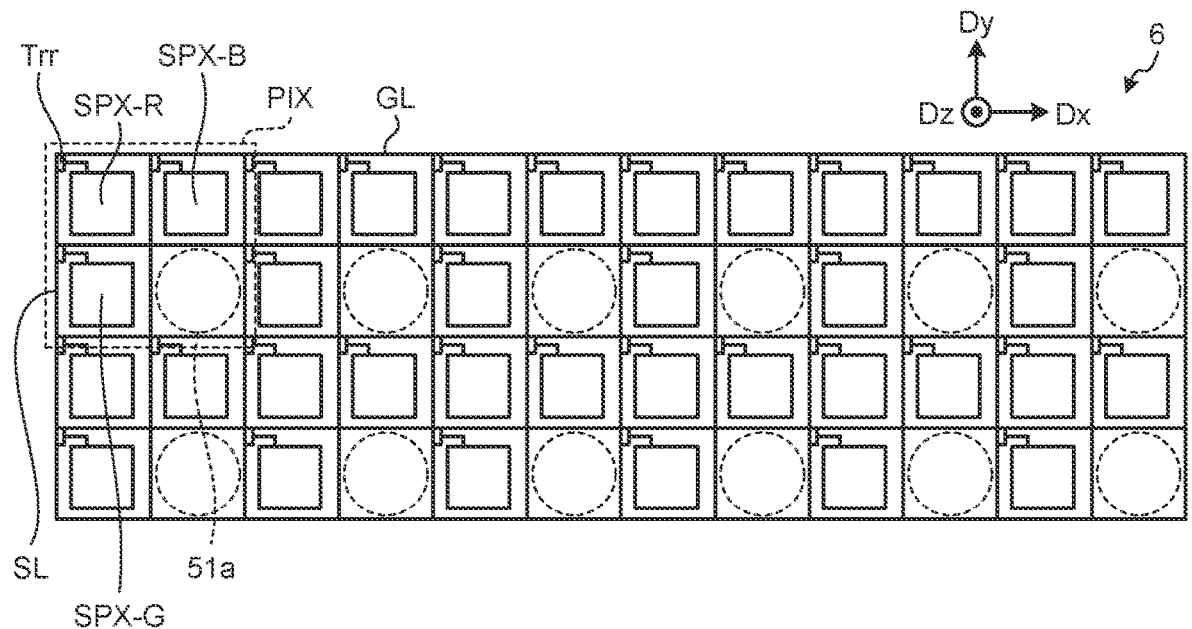
FIG. 8 is a plan view schematically illustrating an arrangement relation between pixels and the light-receiving elements in a display region according to the first embodiment.
Figure 9:
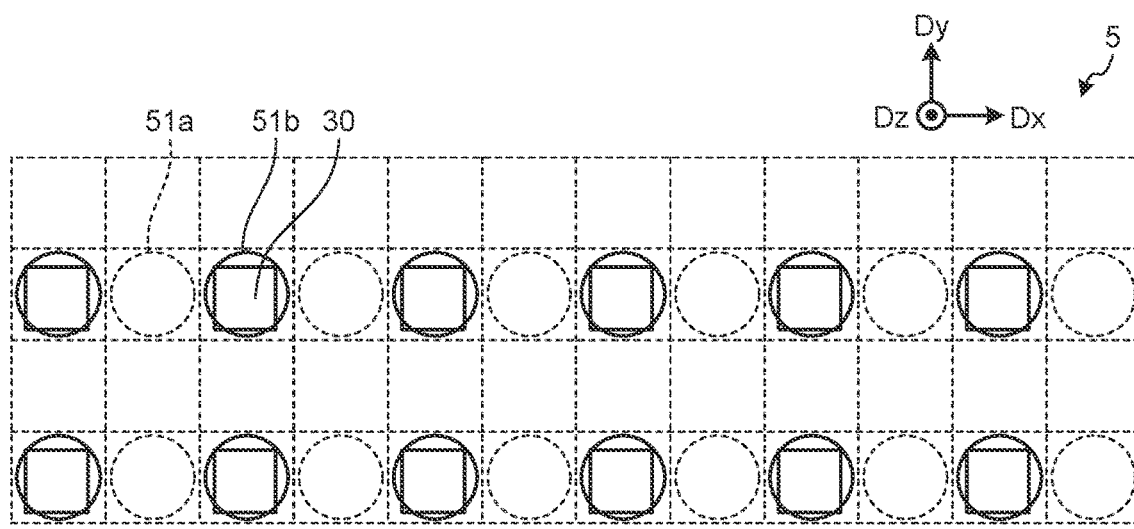
FIG. 9 is a plan view schematically illustrating an arrangement relation between first openings and second openings of light guide paths according to the first embodiment.
Figure 10:
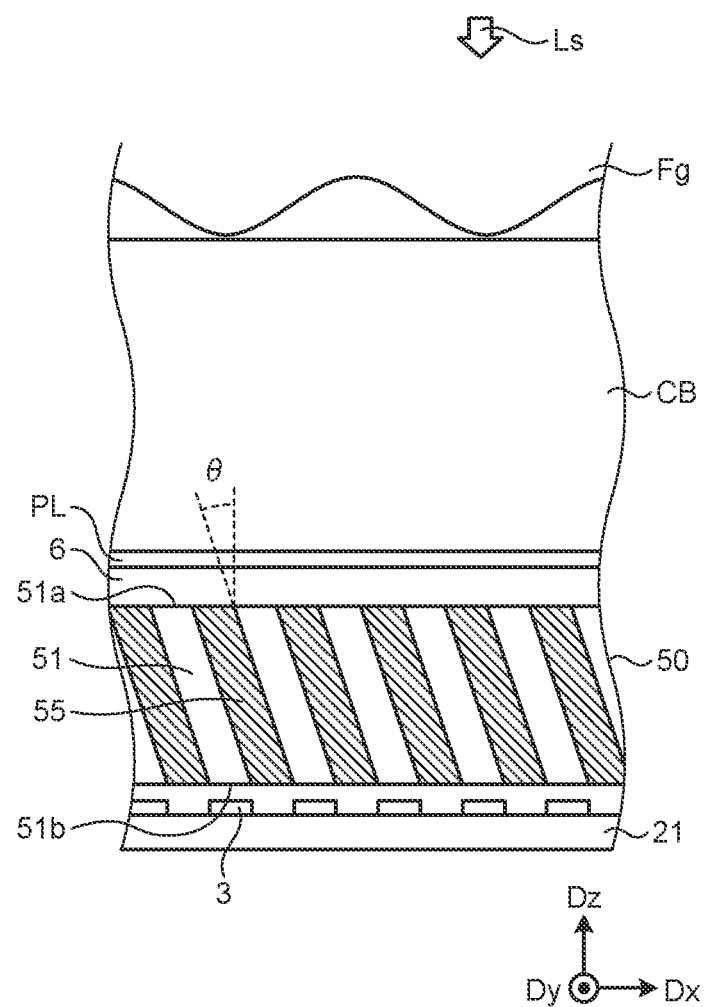
FIG. 10 is a sectional view schematically illustrating the arrangement relation between the first openings and the second openings of the light guide paths according to the first embodiment.

FIG. 8 is a plan view schematically illustrating an arrangement relation between pixels and the light-receiving elements in the display region according to the first embodiment. FIG. 9 is a plan view schematically illustrating an arrangement relation between first openings and second openings of the light guide paths according to the first embodiment. FIG. 10 is a sectional view schematically illustrating the arrangement relation between the first openings and the second openings of the light guide paths according to the first embodiment.

FIG. 8 is a partially enlarged plan view of a portion of the display region DA of the display panel 6 viewed from the third direction Dz (cover member CB side), and the position of a second opening 51a of the light guide path 51 with respect to a pixel PIX in the plan view is indicated by a dotted line. FIG. 9 illustrates a first surface that has a first opening 51b of the light guide path 51 of the light guide 50 illustrated in FIG. 10, and is a range corresponding to the range illustrated in FIG. 8 in the plan view. In the first embodiment, the first opening 51b and the second opening 51a have the same area in the plan view.

The pixel PIX includes sub-pixels SPX-R, SPX-G, and SPX-B. Color regions in three colors of red (R), green (G), and blue (B) correspond, as one set, to the sub-pixels SPX-R, SPX-G, and SPX-B. Since the display panel 6 is an organic EL display panel, the sub-pixels SPX-R, SPX-G, and SPX-B include pixel electrodes having red (R), green (G), and blue (B) organic light-emitting layers. Hereinafter, the sub-pixels SPX-R, SPX-G, and SPX-B are each called "sub-pixel SPX" when they are not distinguished in color. Each of the sub-pixels SPX includes a switching element Trr. A pixel signal line SL extends in the second direction Dy. The pixel signal line SL is wiring for supplying a pixel signal to each of the pixel electrodes. A scan line GL extends in the first direction Dx. The scan line GL is wiring for supplying a drive signal (scan signal) that drives each of the switching elements Trr.

In FIG. 8, the second opening 51a of the light guide path 51 is provided in a position not overlapping the sub-pixel SPX. However, the second opening 51a is not limited to this example, and may be provided in an area overlapping one or more of the sub-pixels SPX.

As illustrated in FIG. 10, the light guide 50 has the light guide paths 51 and the light-blocking portion 55. The light guide paths 51 are arranged in the first direction Dx and the second direction Dy to be provided in a matrix having a row-column configuration. The light guide paths 51 are each capable of transmitting the light L2 (refer to FIG. 2). The absorbance of the light L2 by the light-blocking portion 55 is higher than the absorbance of the light L2 by the light guide paths 51. In other words, the transmittance of the light L2 through the light guide paths 51 is higher than the transmittance of the light L2 through the light-blocking portion 55.

The light-blocking portion 55 is provided around the light guide paths 51, and is constituted by a material difficult to transmit the light L. The absorbance of the light by the light-blocking portion 55 is preferably from 99% to 100%, and is more preferably 100%. The absorbance of the light herein refers to a ratio of a difference between an intensity of incident light Lin and an intensity of output light Lout to the intensity of the incident light Lin ((Lin−Lout)/Lin).

The second openings 51a of the light guide paths 51 illustrated in FIG. 10 are located on a second surface for emitting the light L toward the light-receiving elements 3. As illustrated in FIG. 9, each of the second openings 51a is disposed so as to be shifted in the first direction Dx from the first opening 51b. The first openings 51b of the light guide paths 51 are provided so as to overlap the light-receiving elements 3 of the sensor unit 10, and can accurately emit the light L2 to the light-receiving elements 3.

As illustrated in FIG. 8, the light guide 50 has a surface having the second openings 51a and a surface having the first openings 51b that is located on the side opposite to the surface having the second openings 51a. As illustrated in FIG. 9, the first opening 51b of the light guide 50 faces the light-receiving element 3. The second opening 51a is located in a position not overlapping the sub-pixel SPX. As illustrated in FIG. 9, the first opening 51b and the photodiode 30 are located in a position overlapping the sub-pixel SPX. However, the second opening 51a may also be provided in a position overlapping the sub-pixel SPX.

The light guide paths 51 are also called "light guide columns", and each extend at an angle θ with respect to the third direction Dz from the first surface having the first openings 51b to the second surface having the second openings 51a. That is, the second openings 51a of the light guide paths 51 are shifted in the first direction Dx from the first openings 51b of the light guide 50. This configuration reduces the amount of outside light Ls reaching the light-receiving elements 3, and therefore, the S/N ratio is restrained from decreasing.

Figure 11:
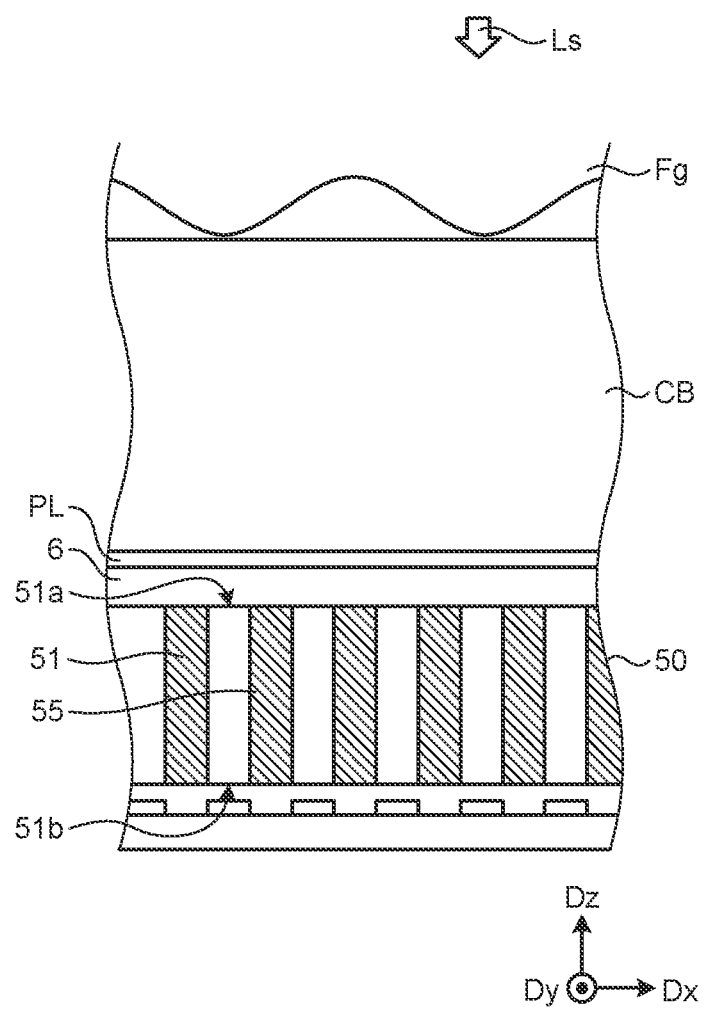
FIG. 11 is a sectional view schematically illustrating an arrangement relation between the first openings and the second openings of the light guide paths according to a comparative example.

FIG. 11 is a sectional view schematically illustrating an arrangement relation between the first openings and the second openings of the light guide paths according to a comparative example. The light guide paths 51 of the comparison example are parallel to the third direction Dz. With the light guide paths according to the comparative example, the other outside light Ls as well as the light L2 emitted from the display panel 6 and reflected by the object to be detected Fg can easily reach the light-receiving elements 3. In contrast, in the first embodiment, when viewed from the third direction Dz, the first opening 51b of the light guide path 51 closest to the photodiode 30 of the light-receiving element 3 overlaps the photodiode 30 of the light-receiving element 3, and the second opening 51a of the light guide path 51 farthest from the photodiode 30 of the light-receiving element 3 does not overlap the first opening 51b. This configuration makes it difficult for the outside light Ls, such as sunlight in the case of outside use, to reach the light-receiving element 3. As a result, noise of the photodiode 30 is reduced, and the sensing sensitivity is improved.

Figure 12A:
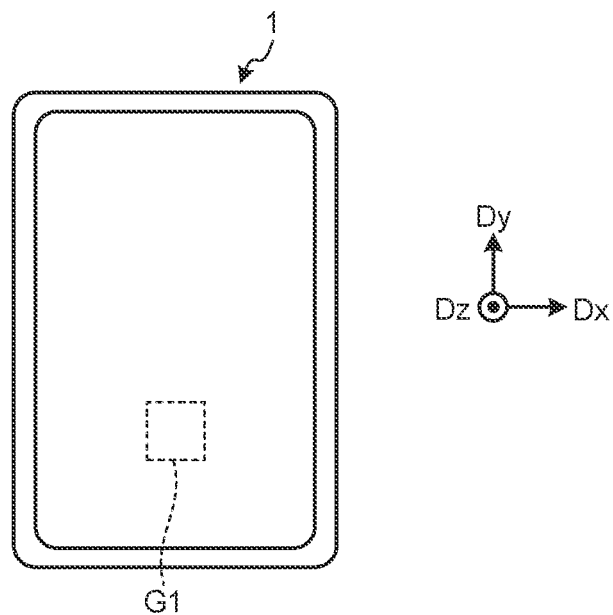
FIG. 12A is a plan view for explaining an operation of the display device.
Figure 12B:
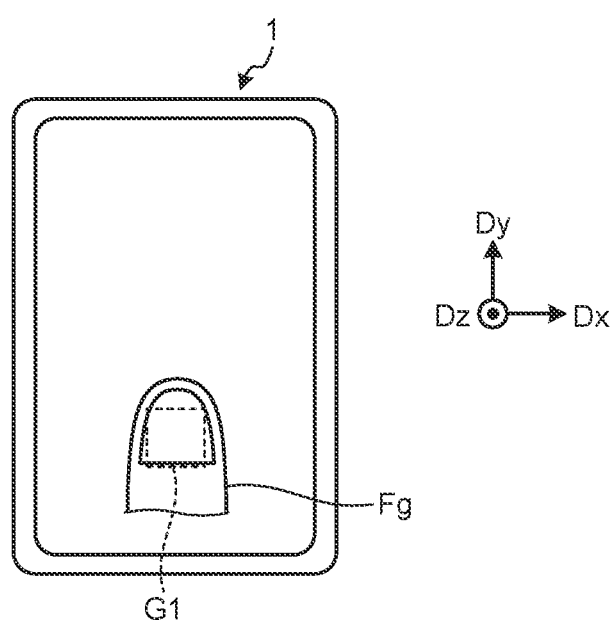
FIG. 12B is a plan view for explaining the operation of the display device.

FIGS. 12A to 12D are plan views for explaining an operation of the display device. The display device 1 illustrated in FIG. 12A displays a detection region G1 of the object to be detected Fg. As a result, the object to be detected Fg is guided to the detection region G1 as illustrated in FIG. 12B. In this situation, if the entire surface of the display region DA illustrated in FIG. 2 emits light, the amount of reflected light generated at an interface between the cover member CB and air increases, and the amount of stray light propagating in the cover member CB increases, thus making it easier for the stray light to reach the detection region G1.

Figure 12C:
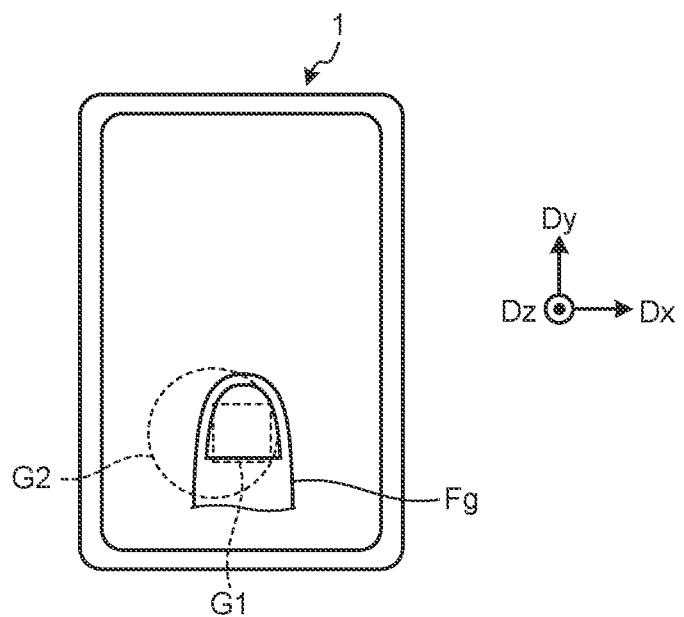
FIG. 12C is a plan view for explaining the operation of the display device.
Figure 12D:
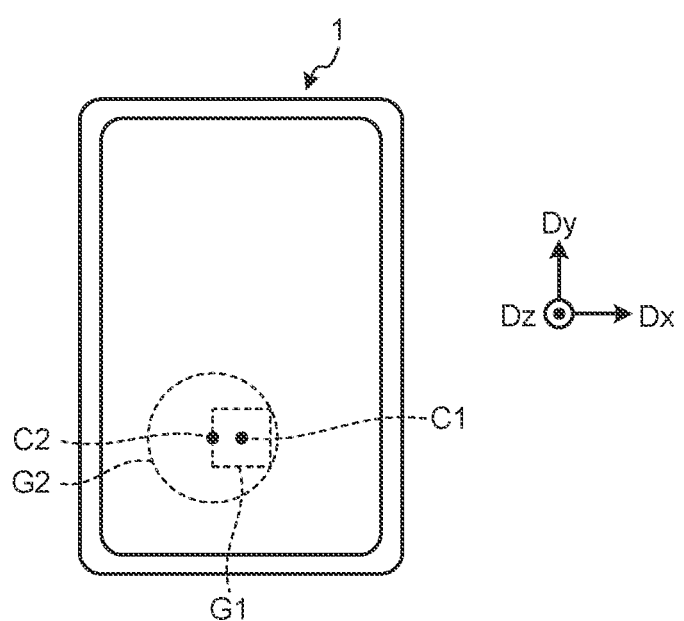
FIG. 12D is a plan view for explaining the operation of the display device.

Therefore, as illustrated in FIG. 12C, the display device 1 causes a light-emitting region G2 of the display panel 6 to partially emit light. As illustrated in FIG. 12D, a centroid C2 of the light-emitting region G2 of the display panel 6 is caused to emit light in a position shifted from a centroid C1 of the detection region G1. This shift between the light-emitting region G2 of the display panel 6 and the detection region G1 reduces the amount of the stray light, and makes it difficult for the stray light to reach the detection region G1. As a result, the noise by the stray light detected in the detection region G1 is reduced.

The direction in which the centroid C2 is shifted from the centroid C1 is the direction in which the second opening 51a is shifted from the first opening 51b. In the light guide path 51 of the first embodiment, the second opening 51a is shifted in the first direction Dx from the first opening 51b of the light guide 50. Therefore, the light reflected from the object to be detected Fg in response to the light emission of the light-emitting region G2 of the display panel 6 can easily enter the light-receiving element 3. As a result, the strength of a signal received by the light-receiving element 3 increases, and the S/N ratio is improved.

In other words, in order to cause the light-receiving element 3 to detect the detection region G1 overlapping the light-receiving element 3 as viewed from the normal direction (third direction Dz) of the display panel 6 and the reflected light from the object to be detected Fg, the light-emitting region G2 as a portion of the display region of the display panel 6 is caused to emit light. When viewed from the visible side in the third direction Dz of the display panel 6, the direction in which the centroid C2 of the light-emitting region G2 is shifted from the centroid C1 of the detection region G1 is the direction in which the light guide path 51 is inclined.

First Modification of First Embodiment

Figure 13:
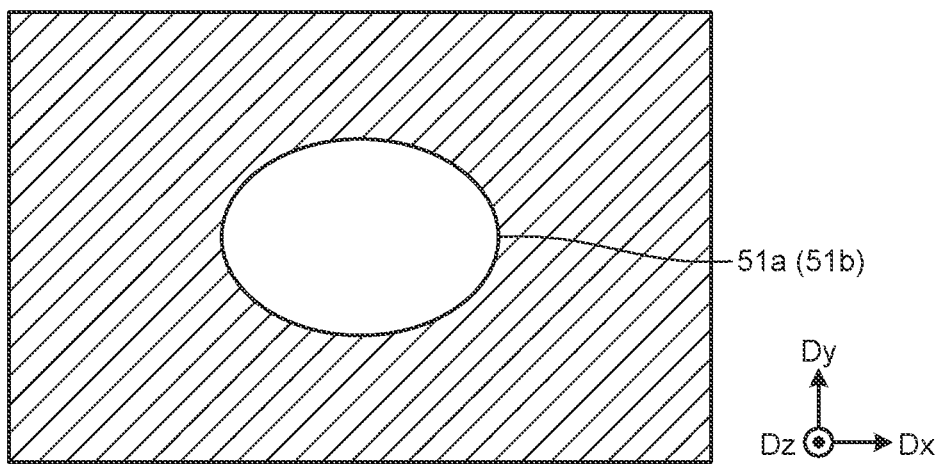
FIG. 13 is a plan view schematically illustrating a shape of a light guide path according to a first modification of the first embodiment.

FIG. 13 is a plan view schematically illustrating a shape of the light guide path according to a first modification of the first embodiment. The same structure as that in the first embodiment is denoted by the same reference numeral, and will not be described in detail. In the first modification, a section of the light guide path 51 obtained by being cut along a virtual plane in the first and the second directions Dx and Dy is elliptical. Therefore, the second opening 51a and the first opening 51b are also elliptical. The direction of the major axis of the ellipse is the first direction Dx, which is along the direction of the shift of the second opening 51a from the first opening 51b. This configuration makes the shape of the projection projected on the photodiode 30 closer to a circular shape. As a result, the detection accuracy of the photodiode 30 is improved.

Second Modification of First Embodiment

Figure 14:
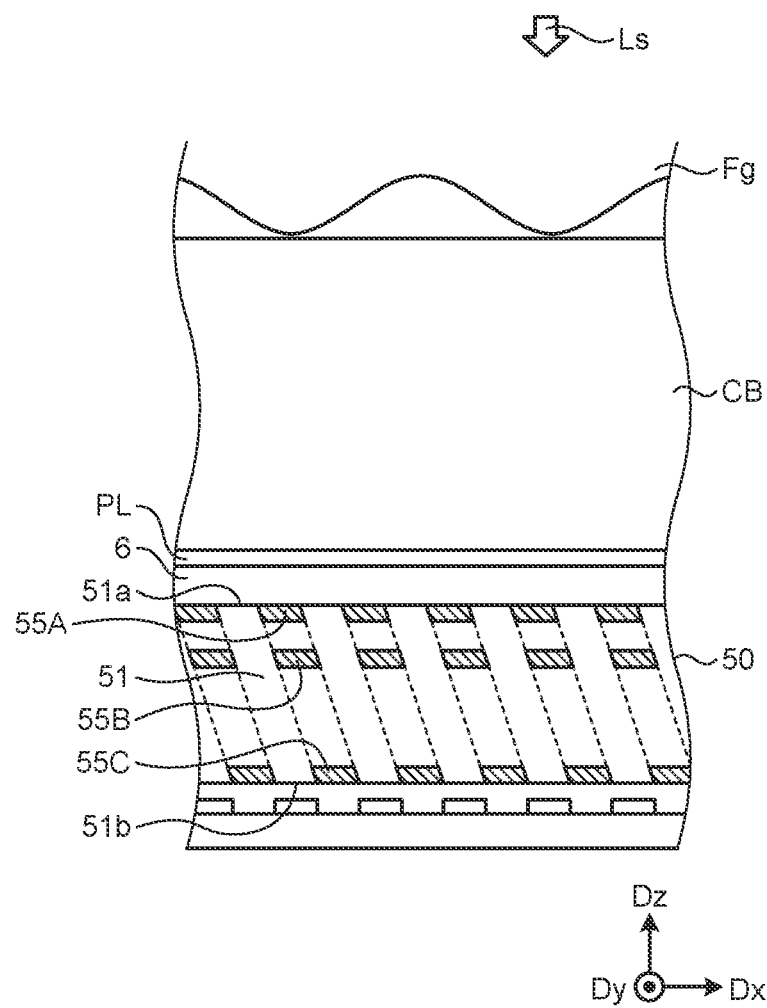
FIG. 14 is a sectional view schematically illustrating a sectional shape of the guide paths according to a second modification of the first embodiment.

FIG. 14 is a sectional view schematically illustrating a sectional shape of the guide paths according to a second modification of the first embodiment. The same structure as that in the first embodiment is denoted by the same reference numeral, and will not be described in detail. The light guide 50 includes the light guide paths 51, light-blocking portions 55A, light-blocking portions 55B, and light-blocking portions 55C. The light-blocking portions 55A, 55B, and 55C are stacked in the third direction Dz. When each of the light-blocking portions 55A, 55B, and 55C is viewed in the third direction Dz, the light guide path 51 serving as a pinhole has an elliptical shape in the same manner as in FIG. 13. The direction of the major axis of this ellipse is the first direction Dx, which is along the direction of the shift of the second opening 51*a* from the first opening 51*b*.

Third Modification of First Embodiment

Figure 15:
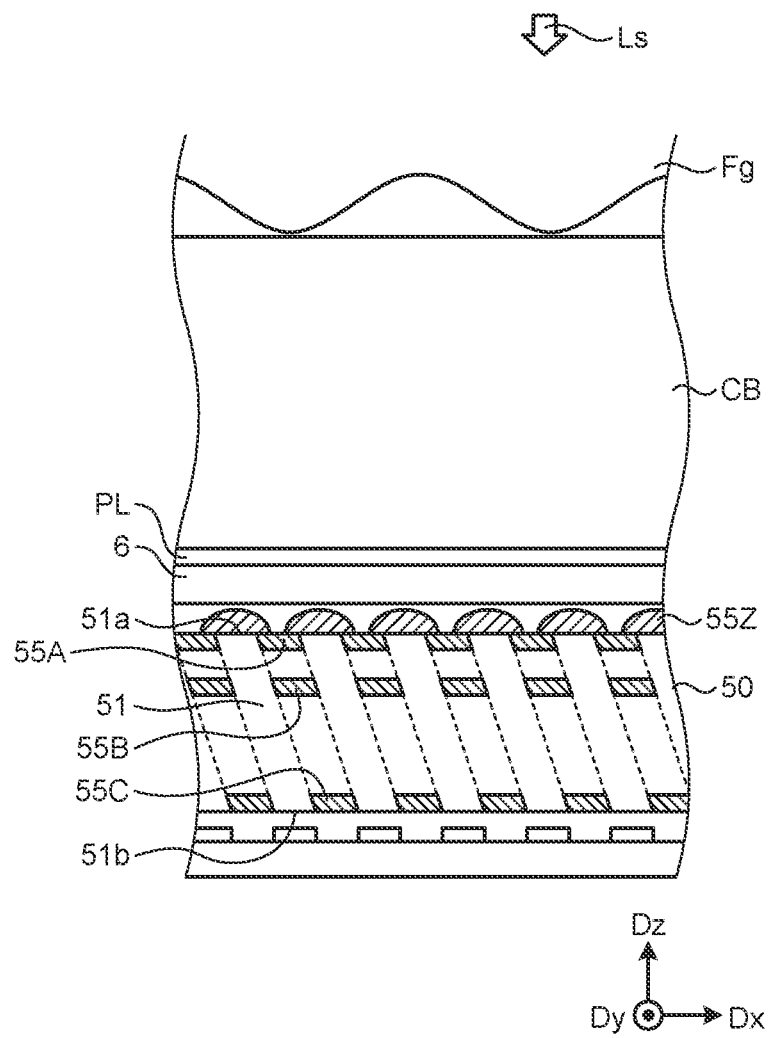
FIG. 15 is a sectional view schematically illustrating a sectional shape of the guide paths according to a third modification of the first embodiment.

FIG. 15 is a sectional view schematically illustrating a sectional shape of the guide paths according to a third modification of the first embodiment. The same structure as that in either of the first embodiment and the second modification of the first embodiment is denoted by the same reference numeral, and will not be described in detail.

In the third modification of the first embodiment, a condenser lens 55Z is provided that covers the upper surface of the second opening 51*a* of the light guide path 51. This configuration accurately sets the condensation focus of the light L projected onto the photodiode 30.

Second Embodiment

Figure 16:
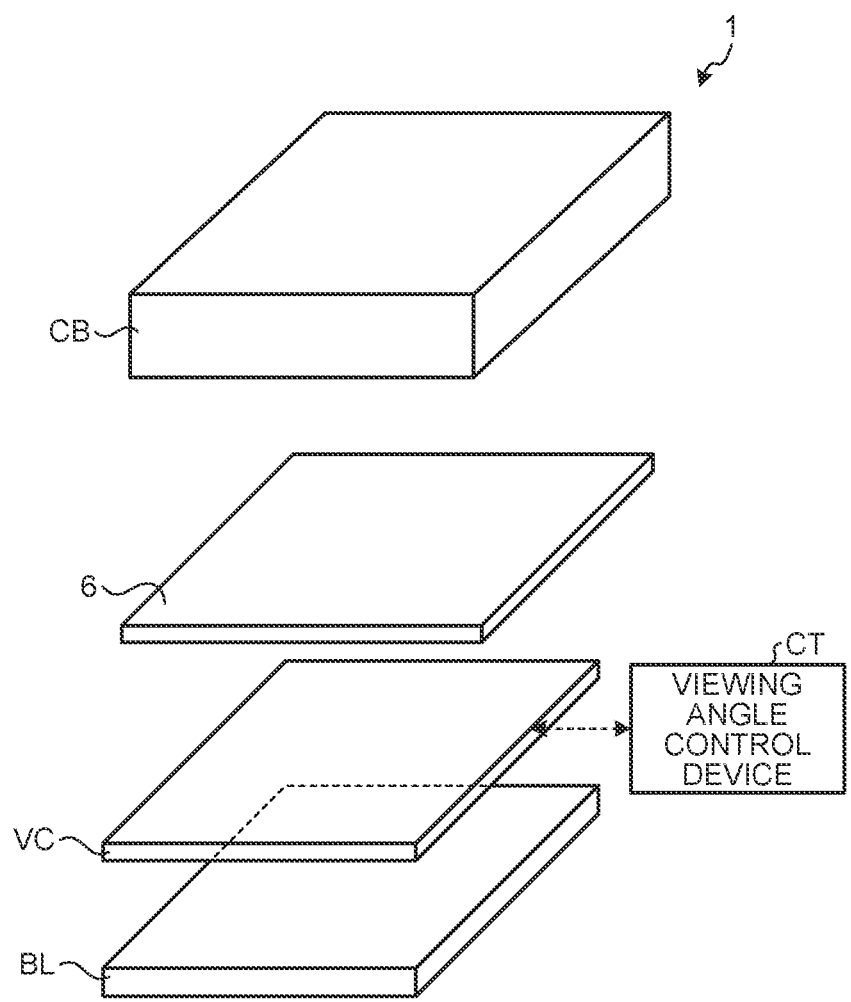
FIG. 16 is a perspective view schematically illustrating the display device according to a second embodiment of the present disclosure.

FIG. 16 is a perspective view schematically illustrating the display device according to a second embodiment of the present disclosure. As illustrated in FIG. 16, the display device 1 includes the display panel 6 incorporating the optical sensor 5, the light-transmitting cover member CB, a dimming panel VC, and a backlight BL. The display panel 6 is a liquid crystal display panel, and the dimming panel VC is superimposed between the display panel 6 and the backlight BL. The dimming panel VC controls the viewing angle of the display panel 6 based on the control by a viewing angle control device CT. The cover member CB is superimposed on the visible side of the display panel 6.

Figure 17:
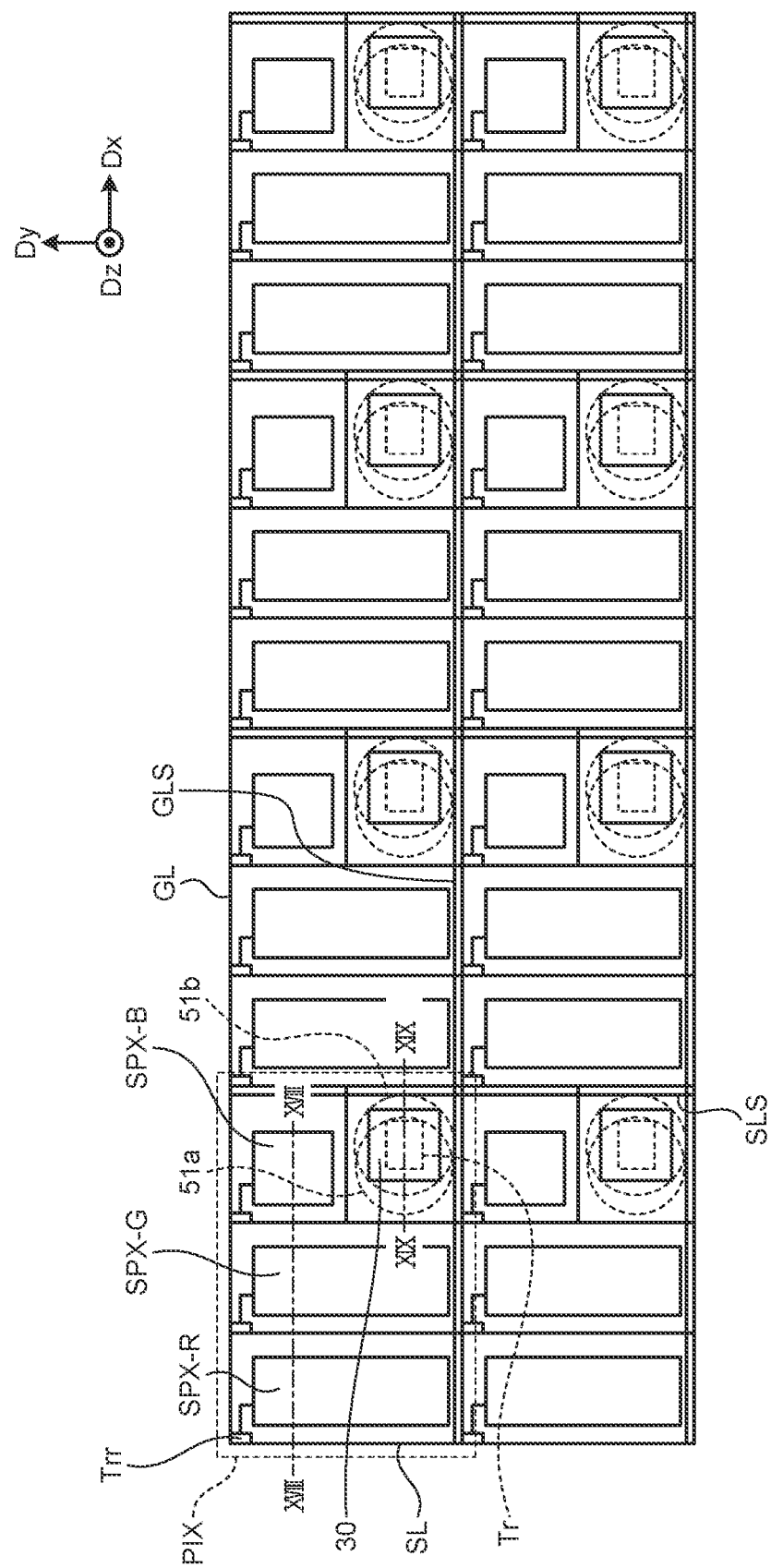
FIG. 17 is a plan view schematically illustrating an arrangement relation between the pixels and the light-receiving elements in the display region according to the second embodiment.
Figure 18:
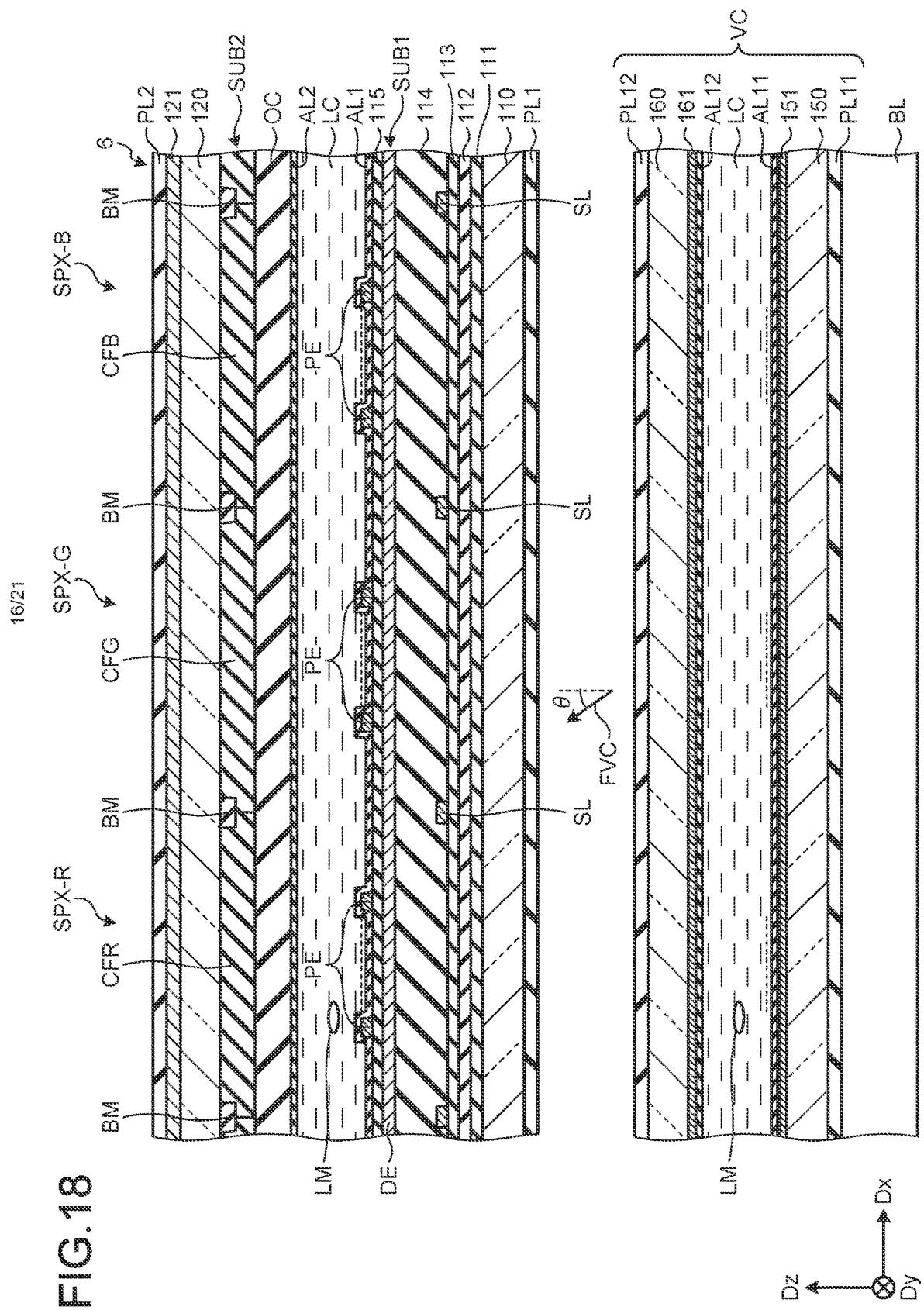
FIG. 18 is a sectional view taken along XVIII-XVIII indicated in FIG. 17.

FIG. 17 is a plan view schematically illustrating an arrangement relation between the pixels and the light-receiving elements in the display region according to the second embodiment. FIG. 18 is a sectional view taken along XVIII-XVIII indicated in FIG. 17. FIG. 18 does not illustrate the light-transmitting cover member CB illustrated in FIG. 16. FIG. 17 illustrates a partially enlarged plan view of a portion of the display region DA of the display panel 6 viewed from the third direction Dz (cover member CB side), and the positions of the first opening 51*b* and the second opening 51*a* of the light guide path 51 with respect to the pixel PIX in the plan view is indicated by dotted lines. The photodiode 30 is disposed in each of the pixels PIX. The photodiode 30 can detect the information on the object to be detected Fg using the light emitted from the display panel 6. The light-receiving element 3 and the light guide 50 are provided inside the display panel 6.

As illustrated in FIG. 18, a liquid crystal layer LC of the display panel 6 is provided between an array substrate SUB1 and a counter substrate SUB2. The array substrate SUB1 includes a first substrate 110 as a base. The counter substrate SUB2 includes a second substrate 120 as a base. The first substrate 110 and the second substrate 120 are formed of a light-transmitting material such as a glass substrate or a resin substrate.

As illustrated in FIG. 18, the counter substrate SUB2 is disposed so as to orthogonally face a surface of the array substrate SUB1. The liquid crystal layer LC is provided between the array substrate SUB1 and the counter substrate SUB2. The array substrate SUB1 includes the first substrate 110 as the base. The counter substrate SUB2 includes the second substrate 120 as the base. The first substrate 110 and the second substrate 120 are formed of a light-transmitting material such as a glass substrate or a resin substrate.

The array substrate SUB1 includes, for example, a first insulating film 111, a second insulating film 112, a third insulating film 113, a fourth insulating film 114, a fifth insulating film 115, the pixel signal lines SL, pixel electrodes PE, a common electrode DE, and a first orientation film AL1 on a side of the first substrate 110 facing the counter substrate SUB2.

A direction from the first substrate 110 toward the second substrate 120 in a direction orthogonal to the first substrate 110 is referred to as "upper side" or simply "above". A direction from the second substrate 120 to the first substrate 110 is referred to as "lower side" or simply "below".

The first insulating film 111 is provided above the first substrate 110. The second insulating film 112 is provided above the first insulating film 111. The third insulating film 113 is provided above the second insulating film 112. The pixel signal lines SL are provided above the third insulating film 113. The fourth insulating film 114 is provided above the third insulating film 113, and covers the pixel signal lines SL. While not illustrated in FIG. 3, the scan lines are provided above the second insulating film 112, for example.

The common electrode DE is provided above the fourth insulating film 114. The common electrode DE is continuously provided over the display region DA. However, the common electrode DE is not limited to this configuration, and may be provided with slits and divided into a plurality of portions. The common electrode DE is covered by the fifth insulating film 115.

The pixel electrodes PE are provided above the fifth insulating film 115, and face the common electrode DE with the fifth insulating film 115 interposed therebetween. The pixel electrodes PE and the common electrode DE are formed of a light-transmitting conductive material such as ITO or IZO. The pixel electrodes PE and the fifth insulating film 115 are covered with the first orientation film AL1.

The first insulating film 111, the second insulating film 112, the third insulating film 113, and the fifth insulating film 115 are formed of a light-transmitting inorganic material such as a silicon oxide or a silicon nitride. The fourth insulating film 114 is formed of a light-transmitting resin material, and has a larger film thickness than those of the other insulating films formed of the inorganic material.

The counter substrate SUB2 includes, for example, a light-blocking layer BM, color filters CFR, CFG, and CFB, an overcoat layer OC, and a second orientation film AL2 on a side of the second substrate 120 facing the array substrate SUB1. The counter substrate SUB2 includes a conductive layer 121 on a side of the second substrate 120 opposite to the array substrate SUB1.

In the display region DA, the light-blocking layer BM is located on the side of the second substrate 120 facing the array substrate SUB1. The light-blocking layer BM defines openings that face the respective pixel electrodes PE. The pixel electrodes PE are demarcated for the respective openings of the pixels PX. The light-blocking layer BM is formed of a black resin material or a light-blocking metal material.

Each of the color filters CFR, CFG, and CFB is located on the side of the second substrate 120 facing the array substrate SUB1, and ends of each of the color filters overlap the light-blocking layer BM. In one example, the color filters CFR, CFG, and CFB are formed of resin materials colored in red, green, and blue, respectively.

The overcoat layer OC covers the color filters CFR, CFG, and CFB. The overcoat layer OC is formed of a light-transmitting resin material. The second orientation film AL2 covers the overcoat layer OC. The first and the second orientation films AL1 and AL2 are formed of, for example, a material that exhibits a horizontal orientation property.

The conductive layer 121 is provided above the second substrate 120. The conductive layer 121 is a light-transmitting conductive material such as ITO. Externally applied static electricity or static electricity charged on a second polarizing plate PL2 flows through the conductive layer 121. The display panel 6 can remove the static electricity in a short time, and thus, can reduce the static electricity applied to the liquid crystal layer LC serving as a display layer. As a result, the display panel 6 can have improved electrostatic discharge (ESD) resistance.

A first polarizing plate PL1 is disposed on a surface facing an outer surface of the first substrate 110. The second polarizing plate PL2 is disposed on an outer surface or a surface on a viewing position side of the second substrate 120. A first polarization axis of the first polarizing plate PL1 and a second polarization axis of the second polarizing plate PL2 are in a crossed Nichols positional relation in a Dx-Dy plane, for example. The display panel 6 may include other optical functional elements, such as a retardation plate, in addition to the first and the second polarizing plates PL1 and PL2.

The array substrate SUB1 and the counter substrate SUB2 are arranged such that the first and the second orientation films AL1 and AL2 face each other. The liquid crystal layer LC is encapsulated between the first and the second orientation films AL1 and AL2. The liquid crystal layer LC is constituted by a negative liquid crystal material having negative dielectric constant anisotropy or a positive liquid crystal material having positive dielectric constant anisotropy.

For example, when the liquid crystal layer LC is a negative liquid crystal material and no voltage is applied to the liquid crystal layer LC, liquid crystal molecules LM are initially oriented with the major axes thereof aligned along the first direction Dx in the Dx-Dy plane. In contrast, when a voltage is applied to the liquid crystal layer LC, that is, in an on state where an electric field is formed between the pixel electrodes PE and the common electrode DE, the liquid crystal molecules LM are affected by the electric field, and the orientation state thereof changes. In the on state, linearly polarized light incident on the liquid crystal layer LC changes in the polarization state thereof according to the orientation state of the liquid crystal molecules LM when passing through the liquid crystal layer LC.

The switching element Trr, the pixel signal line SL, and the scan line GL of each of the sub-pixels SPX illustrated in FIG. 17 are formed in the array substrate SUB1. The pixel signal line SL extends in the second direction Dy. The pixel signal line SL is the wiring for supplying the pixel signal to each of the pixel electrodes PE (refer to FIG. 18). The scan line GL extends in the first direction Dx. The scan line GL is the wiring for supplying the drive signal (scan signal) that drives each of the switching elements Trr.

The pixel PIX includes the sub-pixels SPX. Each of the sub-pixels SPX includes the switching element Trr. The switching element Trr is constituted by a thin-film transistor, and in this example, is constituted by an re-channel metal oxide semiconductor (MOS) TFT. The fifth insulating film 115 is provided between the pixel electrodes PE and the common electrode DE illustrated in FIG. 18, and these components provide a storage capacity.

The color regions colored in, for example, three colors of red (R), green (G), and blue (B) are periodically arranged as the color filters CFR, CFG, and CFB illustrated in FIG. 18.

The color regions in the three colors of red (R), green (G), and blue (B) correspond, as one set, to the sub-pixels SPX-R, SPX-G, and SPX-B. The sub-pixels SPX corresponding to the three color regions constitute the pixel PIX as one set. That is, the display panel 6 includes the sub-pixel SPX-R that displays red, the sub-pixel SPX-G that displays green, and the sub-pixel SPX-B that displays blue. The color filters may include color regions for four or more colors. In this case, the pixel PIX may include four or more sub-pixels SPX.

As illustrated in FIG. 18, the dimming panel VC is interposed between the display panel 6 and the backlight BL. The following describes a specific structure of the dimming panel VC.

As illustrated in FIG. 18, the liquid crystal layer LC of the dimming panel VC is provided between a third substrate 150 and a fourth substrate 160. The liquid crystal layer LC of the dimming panel VC is formed of a liquid crystal in a vertical electric field mode, such as a twisted nematic (TN) liquid crystal. The liquid crystal layer LC of the light control panel VC may use a liquid crystal in any of various modes, such as a vertical alignment (VA) mode and an electrically controlled birefringence (ECB) mode. The third substrate 150 and the fourth substrate 160 are formed of a light-transmitting material such as a glass substrate or a resin substrate.

A first electrode 151 and a third orientation film AL11 are provided on a side of the third substrate 150 facing the fourth substrate 160. The first electrode 151 is formed of a light-transmitting conductive material such as ITO or IZO. The first electrode 151 is covered with the third orientation film AL11.

A second electrode 161 and a fourth orientation film AL12 are provided on a side of the fourth substrate 160 facing the third substrate 150. The second electrode 161 is formed by a light-transmitting conductive material such as ITO or IZO. The second electrode 161 is covered with the fourth orientation film AL12.

An electric field between the first and the second electrodes 151 and 161 is controlled by the viewing angle control device illustrated in FIG. 16. The viewing angle control device illustrated in FIG. 16 can incline a main viewing direction FVC, for example, by the angle θ with respect to the third direction Dz from a direction parallel to the third direction Dz toward the first direction Dx.

A third polarizing plate PL11 is disposed on a surface facing an outer surface of the third substrate 150. A fourth polarizing plate PL12 is disposed on an outer surface or a surface on the viewing position side of the fourth substrate 160. A polarization axis of the third polarizing plate PL11 and the second polarization axis of the fourth polarizing plate PL12 are in a crossed Nichols positional relation in the Dx-Dy plane, for example. The dimming panel VC may include other optical functional elements, such as a retardation plate, in addition to the third and the fourth polarizing plates PL11 and PL12.

FIG. 19 is a sectional view taken along XIX-XIX indicated in FIG. 17. FIG. 19 does not illustrate the light-transmitting cover member CB, the dimming panel VC, and backlight BL illustrated in FIG. 16. As illustrated in FIG. 17, the second opening 51a of the light guide path 51 is disposed in a position not overlapping any one of the sub-pixels SPX-R, SPX-G, and SPX-B in the plan view.

The light-receiving element 3 is built into the array substrate SUB1. The first transistor Tr that drives the light-receiving element 3 includes the semiconductor layer 61, the source electrode 62, the drain electrode 63, gate electrodes 64, and light-blocking layers 69. The light-blocking layers 69 are metal layers that block light from the backlight BL. An upper portion of the photodiode 30 is coupled to the power supply signal line Lvs (FIG. 5) through the coupling wiring 36.

The light-blocking layers 69 are provided above the first substrate 110. The first insulating film 111 is provided above the first substrate 110 so as to cover the light-blocking layers 69. The semiconductor layer 61 is provided above the first insulating film 111. The second insulating film 112 is provided above the first insulating film 111 so as to cover the semiconductor layer 61. The gate electrodes 64 are provided above the second insulating film 112.

The third insulating film 113 is provided above the second insulating film 112 so as to cover the gate electrodes 64. The source electrode 62 (output signal line SLS) and the drain electrode 63 (third conductive layer 67) are provided above the third insulating film 113. In the second embodiment, the drain electrode 63 is electrically coupled to the semiconductor layer 61 through a through-hole passing through the second insulating film 112 and the third insulating film 113. The source electrode 62 is electrically coupled to the semiconductor layer 61 through the first conductive layer 65 in a contact hole.

An insulating layer 141 is provided above the third insulating film 113 so as to cover the source electrode 62 (output signal line SLS) and the drain electrode 63.

The photodiode 30 is formed above the insulating layer 141. A lower portion of the photodiode 30 is electrically coupled to the drain electrode 63 through a contact hole.

An insulating layer 142 covers the photodiode 30, and is provided above the insulating layer 141. The source electrode 62 is provided above the insulating layer 142. An insulating layer 143 is formed above the insulating layer 142 so as to cover the source electrode 62. An insulating layer 144 is formed above the insulating layer 144 so as to cover the coupling wiring 36. The fourth insulating film 114 described above includes insulating layers 141, 142, 143, and 144.

As illustrated in FIG. 19, the counter substrate SUB2 includes the light guide 50. The light guide 50 illustrated in FIG. 19 is formed in the same layer as that of the light-blocking layer BM and the color filters CFR, CFG, and CFB illustrated in FIG. 18. The light guide 50 includes the light guide paths 51 and the light-blocking portion 55. Each of the light guide paths 51 can transmit the light L2 (refer to FIG. 2). The light-blocking portion 55 is formed of the same material as that of the light-blocking layer BM.

An infrared reducing layer 59 is formed on the first surface where the first opening 51b is formed. The infrared reducing layer 59 is an optical filter that reduces infrared light and does not easily reduce visible light from the light L2 (refer to FIG. 2). The infrared reducing layer 59 makes the photodiode 30 less susceptible to the infrared light. The infrared reducing layer 59 need not be provided.

As illustrated in FIGS. 17 and 19, the light guide path 51 is called "light guide column", and extends from the first surface having the first opening 51b to the second surface having the second opening 51a at the angle θ with respect to the third direction Dz. That is, the second openings 51a of the light guide paths 51 are shifted in the first direction Dx from the first openings 51b of the light guide 50. This configuration makes it difficult for stray light propagating through the liquid crystal layer LC to be viewed through the light guide 50, thus reducing black floating of the display panel 6 and improving the display quality.

Figure 20:
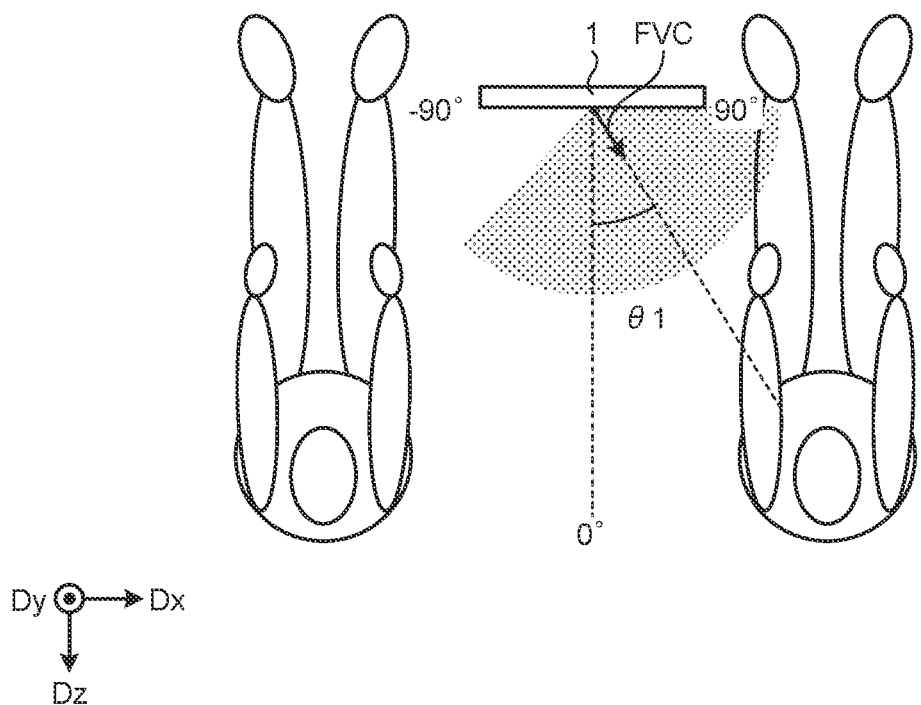
FIG. 20 is an explanatory diagram for explaining a main viewing direction of the display device according to the second embodiment.

FIG. 20 is an explanatory diagram for explaining the main viewing direction of the display device according to the second embodiment. When the display device 1 of the second embodiment is mounted on a vehicle, the display device 1 can be switched between a first mode in which the display device 1 is visible from both the driver's seat and the front passenger seat, and a second mode in which the display device 1 is visible only from the front passenger seat. As illustrated in FIG. 20, in the second mode, the main viewing direction FVC is controlled such that a screen can be viewed from the front passenger seat while the screen cannot be seen from the driver's seat.

Figure 21:
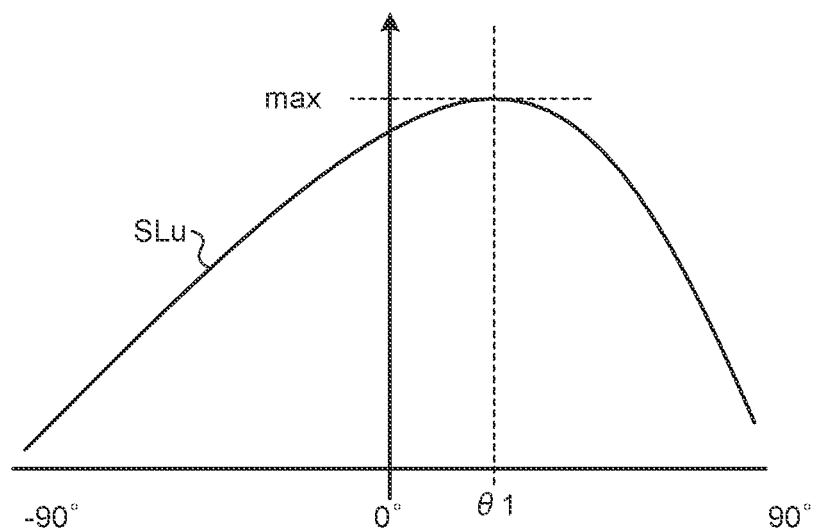
FIG. 21 is an explanatory diagram for explaining a relation between a viewing angle and a distribution of luminance in a horizontal plane of the display device according to the second embodiment.

FIG. 21 is an explanatory diagram for explaining a relation between the viewing angle and a distribution of luminance in a horizontal plane of the display device according to the second embodiment. In FIG. 21, the horizontal axis represents the viewing angle in the horizontal plane, and the vertical axis represents the luminance. In the display device 1 illustrated in FIG. 20, the main viewing direction FVC denotes a direction having a main viewing angle θ1 at which the distribution of luminance SLu is maximized as illustrated in FIG. 21.

Figure 22:
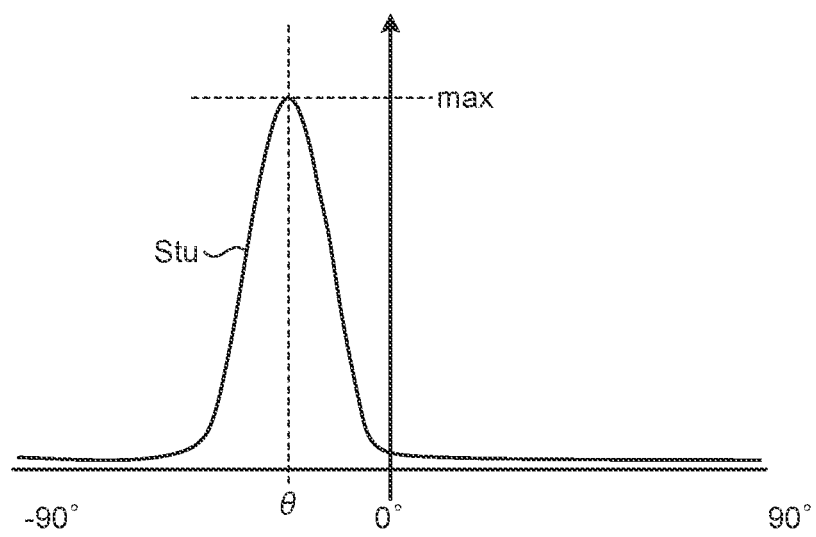
FIG. 22 is an explanatory diagram for explaining directionality of sensitivity of a detection element according to the second embodiment.
Figure 23:
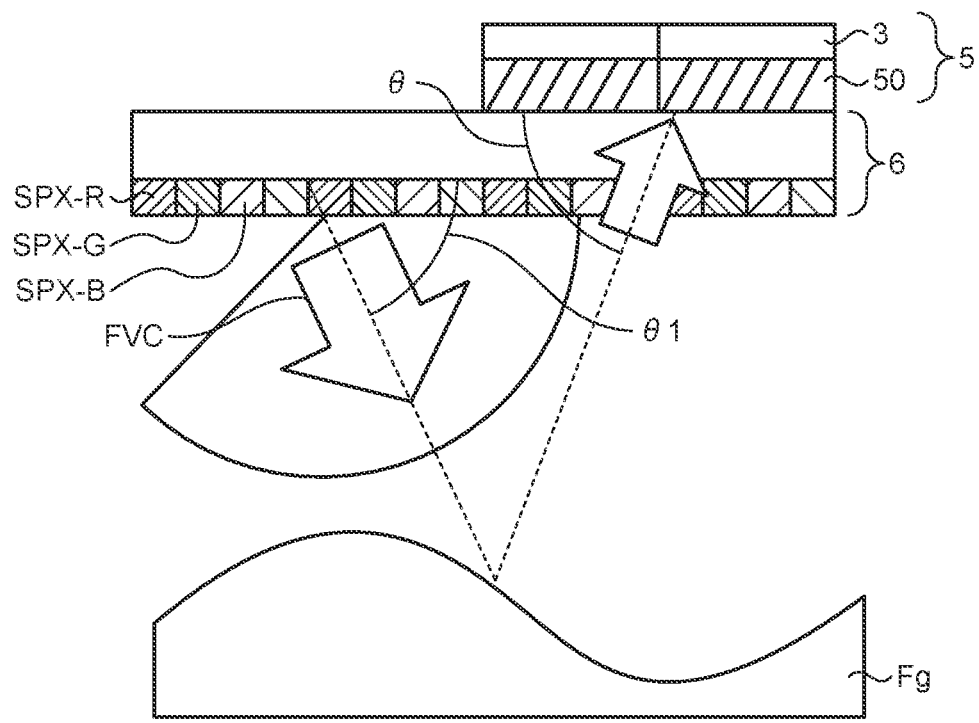
FIG. 23 is a schematic diagram for explaining a relation between the viewing angle and the directionality of sensitivity of the detection element in the horizontal plane of the display device according to the second embodiment.

FIG. 22 is an explanatory diagram for explaining directionality of sensitivity of the detection element according to the second embodiment. FIG. 23 is a schematic diagram for explaining a relation between the viewing angle and the directionality of sensitivity of the detection element in the horizontal plane of the display device according to the second embodiment. In FIG. 23, the optical sensor 5 is located on the back side of the display panel 6 in order to be illustrated separately from the display panel 6, but, in reality, the optical sensor 5 is built into the display panel 6. In FIG. 22, the horizontal axis represents the angle in the horizontal plane, and the vertical axis represents the sensitivity of the light-receiving element 3. As illustrated in FIG. 22, the peak of sensitivity Stu of the light-receiving element 3 is shifted in the opposite direction of the angle of the main viewing direction FVC.

When the display device 1 (refer to FIG. 20) is operated and the object to be detected Fg is located in the third direction Dz of the display device 1 as illustrated in FIG. 23, the light emitted from the display panel has a peak of luminance in the main viewing direction FVC. When the light emitted from the display panel is incident on the object to be detected Fg, the reflected light is reflected at an angle of reflection corresponding to an angle of incidence. Therefore, by shifting the peak of the sensitivity Stu of the light-receiving element 3 in the opposite direction of the angle of the main viewing direction FVC, the reflected light from the object to be detected Fg increases that passes through the light guide 50 and reaches the light-receiving element 3. As a result, the sensitivity of the light-receiving element 3 is improved.

If the object to be detected Fg illustrated in FIG. 23 is an ideal plane, the angle of incidence is almost equal to the angle of reflection. Therefore, the amount of the main viewing angle θ1 is preferably equal to the amount of the angle θ at which the sensitivity Stu of the light-receiving element 3 is maximized. The sensitivity of the light-receiving element 3 is higher as the above-described amount of the angle θ is closer to the amount of the main viewing angle θ1 of the display panel 6. Alternatively, when the direction in which the main viewing angle θ1 is shifted from the third direction Dz is along the opposite direction of the direction in which the light guide path 51 is inclined, the sensitivity Stu of the light-receiving element 3 increases.

As described above, the main viewing angle θ1 of the display panel 6 is shifted from the normal direction of the display panel 6 (third direction Dz). When viewed from the visible side in the normal direction of the display panel 6, the first opening 51b of the light guide path 51 closest to the light-receiving element 3 is shifted from the second opening 51a of the light guide path 51 farthest from the light-receiving element 3. When viewed from the visible side in the third direction Dz of the display panel 6, the direction in which the main viewing angle θ1 of the display panel 6 is shifted from the third direction Dz of the display panel 6 is the direction in which the first opening 51b is shifted from the second opening 51a. The direction in which the main viewing angle θ1 of the display panel 6 is shifted from the third direction Dz of the display panel 6 is the opposite direction of the direction in which the second opening 51a is shifted from the first opening 51b. When the direction in which the main viewing angle θ1 of the display panel 6 is shifted from the third direction Dz of the display panel 6 is not the same as, but along the direction in which the second opening 51a is shifted from the first opening 51b, the reflected light of light of the display panel 6 can be guided to the light-receiving element 3. As a result, the light-receiving element 3 can output sufficient detection data.

First Modification of Second Embodiment

FIG. 24 is a sectional view of the light-receiving element according to a first modification of the second embodiment. The section in FIG. 24 is a modification of the section taken along XIX-XIX illustrated in FIG. 17. The same structure as that in either of the first embodiment, the second modification of the first embodiment, and the second embodiment is denoted by the same reference numeral, and will not be described in detail. The light guide 50 includes the light guide paths 51, the light-blocking portions 55A, the light-blocking portions 55B, and the light-blocking portions 55C. The light-blocking portions 55A, 55B, and 55C are stacked in the third direction Dz. When each of the light-blocking portions 55A, 55B, and 55C is viewed in the third direction Dz, the light guide path 51 serving as a pinhole has an elliptical shape in the same manner as in FIG. 13. The direction of the major axis of this ellipse is the first direction Dx, which is along the direction of the shift of the second opening 51a from the first opening 51b.

Although the preferred embodiments of the present disclosure have been described above, the present disclosure is not limited to the embodiments described above. The content disclosed in the embodiments is merely an example, and can be variously modified within the scope not departing from the gist of the present disclosure. Any modifications appropriately made within the scope not departing from the gist of the present disclosure also naturally belong to the technical scope of the present disclosure.

For example, in the embodiments of the present disclosure, the examples have been described in which the direction in which the second opening 51a is shifted from the first opening 51b is the first direction Dx, but the direction in which the second opening 51a is shifted from the first opening 51b can be any direction in the Dx-Dy plane.

As illustrated in FIG. 23, the optical sensor 5 may be located on the back side of the display panel 6 that serves as a liquid crystal display device.

What is claimed is:
1. A display device comprising:
a display panel;
a plurality of light-receiving elements that are located inside a display region of the display panel as viewed from a normal direction of the display panel, and are configured to receive light; and
a light guide provided so as to overlap the light-receiving elements, wherein
the light guide comprises light guide paths at least partially overlapping the light-receiving elements, and comprises a light-blocking portion having higher absorbance of the light than that of the light guide paths,
the light guide paths are inclined in a predetermined first direction with respect to the normal direction of the display panel,
when viewed from a visible side in the normal direction of the display panel, first openings of the light guide paths closest to the light-receiving elements are shifted from second openings of the light guide paths farthest from the light-receiving elements,
in order to cause the light-receiving elements to detect a detection region overlapping the light-receiving elements as viewed from the normal direction of the display panel, and detect reflected light from an object to be detected, a light-emitting region as a portion of the display region of the display panel is configured to emit light, and
when viewed from the visible side in the normal direction of the display panel, a direction in which a centroid of the light-emitting region is shifted from a centroid of the detection region is a direction in which the second openings are shifted from the first openings.

2. The display device according to claim 1, wherein, when viewed from the visible side in the normal direction of the display panel, the first openings of the light guide paths closest to the light-receiving elements are shifted from the second openings of the light guide paths farthest from the light-receiving elements.

3. The display device according to claim 2, wherein the light guide paths have a shape of an ellipse in a plane orthogonal to the normal direction of the display panel, and the second openings of the light guide paths are shifted from the first openings in a direction in which a major axis of the ellipse extends.

4. The display device according to claim 2, wherein the light guide comprises lenses that cover the second openings.

5. The display device according to claim 1, wherein, when viewed from the normal direction of the display panel, the first openings of the light guide paths closest to the light-receiving elements overlap the light-receiving elements, and the second openings of the light guide paths farthest from the light-receiving elements do not overlap the first openings.

6. The display device according to claim 1, wherein
in order to cause the light-receiving elements to detect the detection region overlapping the light-receiving elements as viewed from the normal direction of the display panel, and detect reflected light from the object to be detected, the light-emitting region as the portion of the display region of the display panel is configured to emit light, and
the direction in which the centroid of the light-emitting region is shifted from the centroid of the detection region is the first direction when viewed from the visible side in the normal direction of the display panel.

7. The display device according to claim 1, comprising an optical sensor comprising the light-receiving elements, wherein the optical sensor is located on a side opposite to the visible side of the display panel, and overlaps the display region of the display panel.

8. The display device according to claim 1, wherein the light-receiving elements and the light guide are provided inside the display panel.

9. The display device according to claim 1, wherein
the display panel comprises an array substrate and a counter substrate facing the array substrate in the normal direction of the display panel,
the light-receiving elements are provided on the array substrate, and
the light guide is provided on the counter substrate.

10. The display device according to claim 1, wherein
a main viewing angle of the display panel is shifted from the normal direction of the display panel,
when viewed from the visible side in the normal direction of the display panel, the first openings of the light guide paths closest to the light-receiving elements are shifted from the second openings of the light guide paths farthest from the light-receiving elements, and
when viewed from the visible side in the normal direction of the display panel, a direction in which the main viewing angle of the display panel is shifted from the normal direction of the display panel is a direction in which the first openings are shifted from the second openings.

11. The display device according to claim 1, wherein
a main viewing angle of the display panel is shifted from the normal direction of the display panel, and
when viewed from the visible side in the normal direction of the display panel, a direction in which the main viewing angle of the display panel is shifted from the normal direction of the display panel is an opposite direction of the first direction.

* * * * *